July 31, 1962

J. V. FOA 3,046,732

METHOD OF ENERGY EXCHANGE AND APPARATUS
FOR CARRYING OUT THE SAME

Filed June 20, 1956

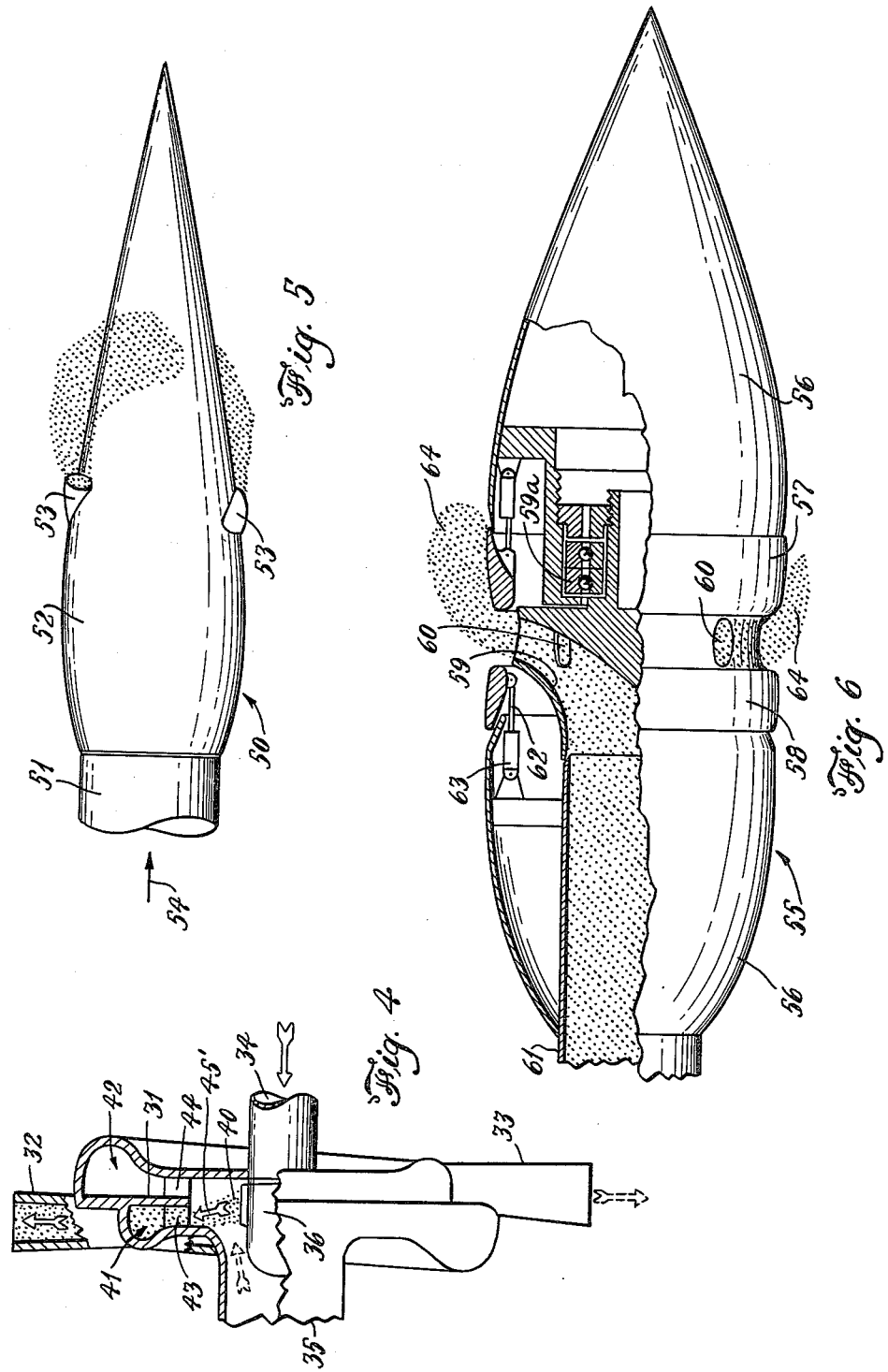

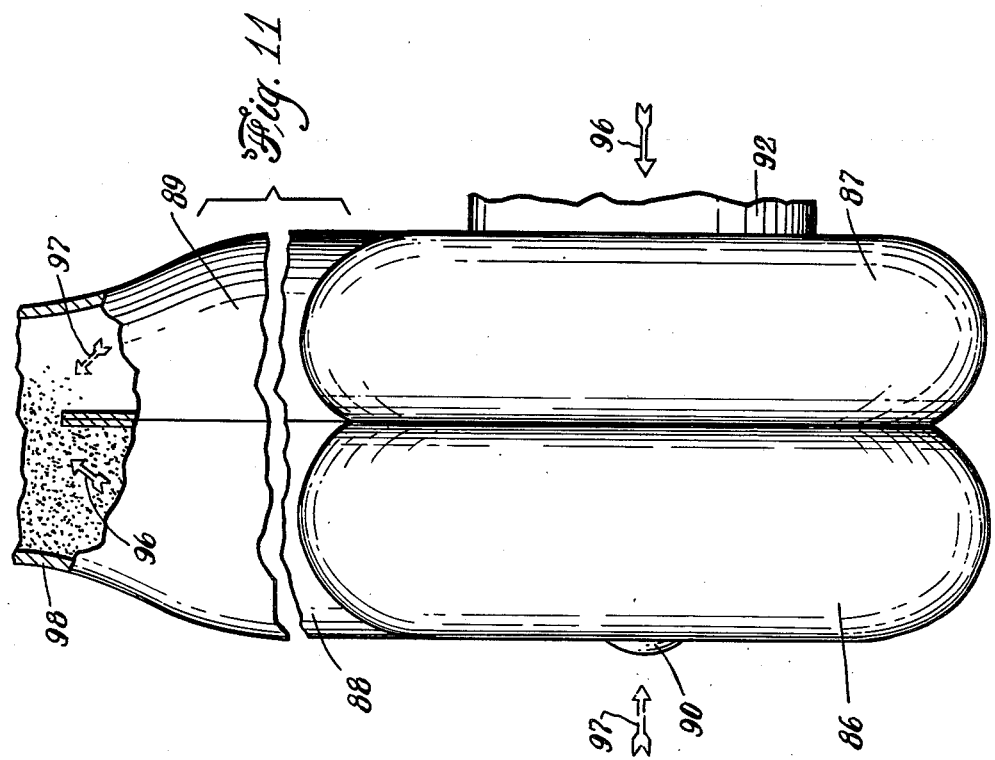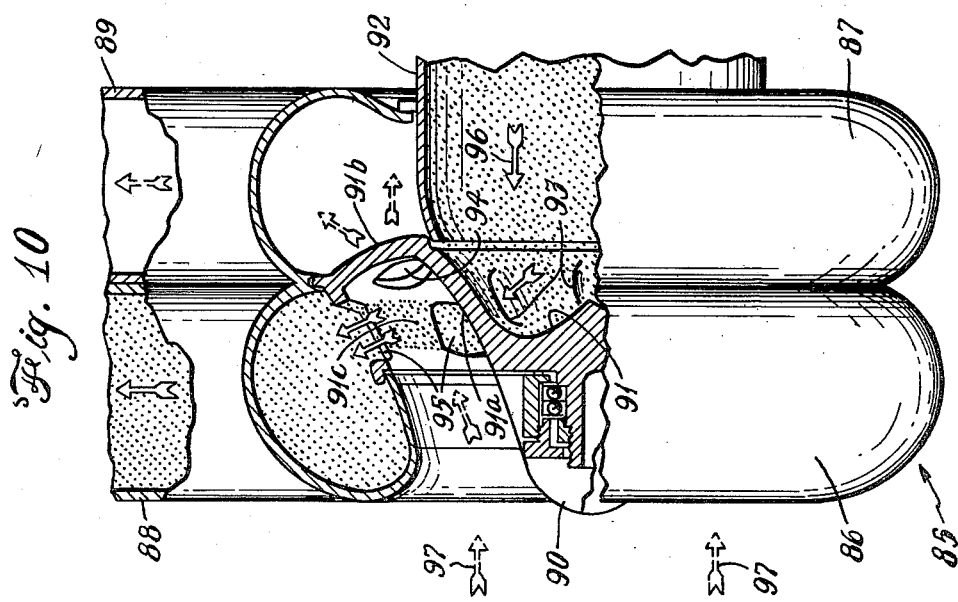

July 31, 1962 J. V. FOA 3,046,732
METHOD OF ENERGY EXCHANGE AND APPARATUS
FOR CARRYING OUT THE SAME
Filed June 20, 1956 7 Sheets-Sheet 5
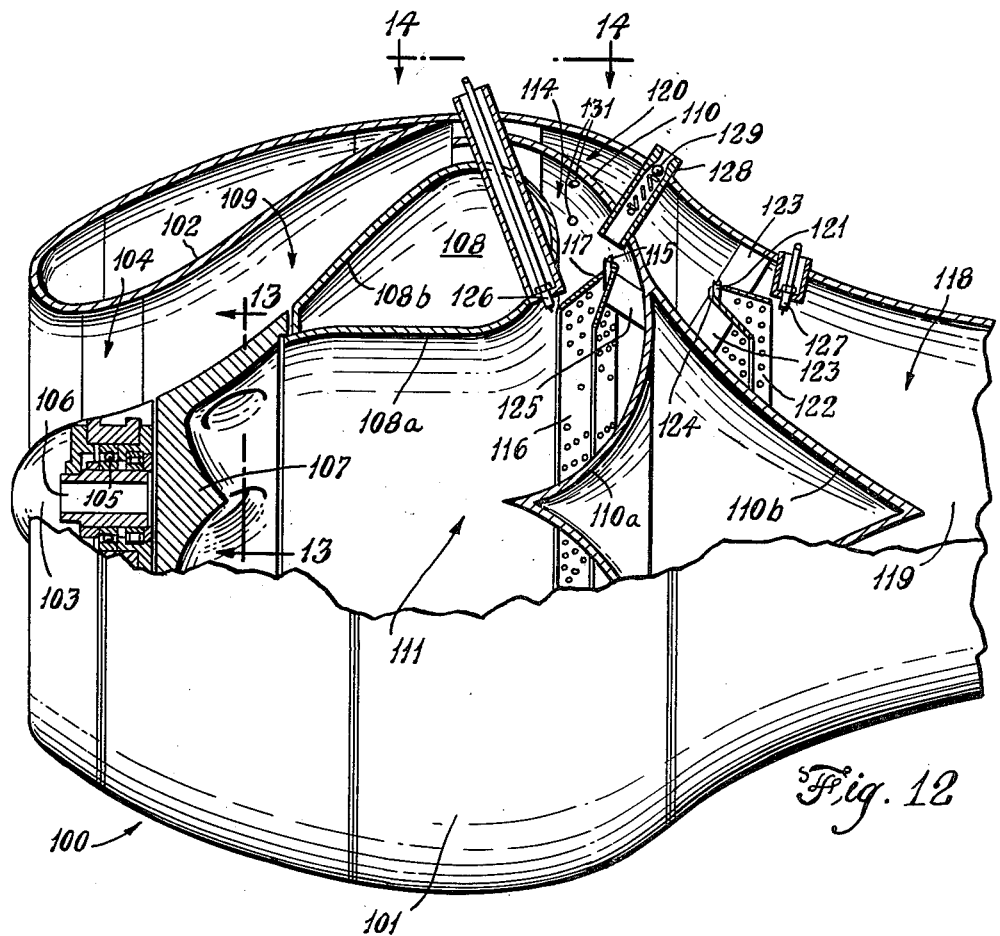
Fig. 12
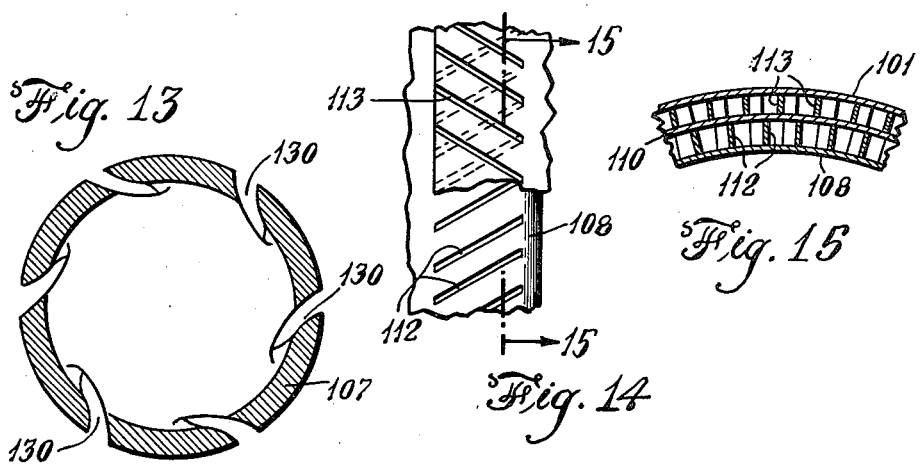
Fig. 13
Fig. 14
Fig. 15

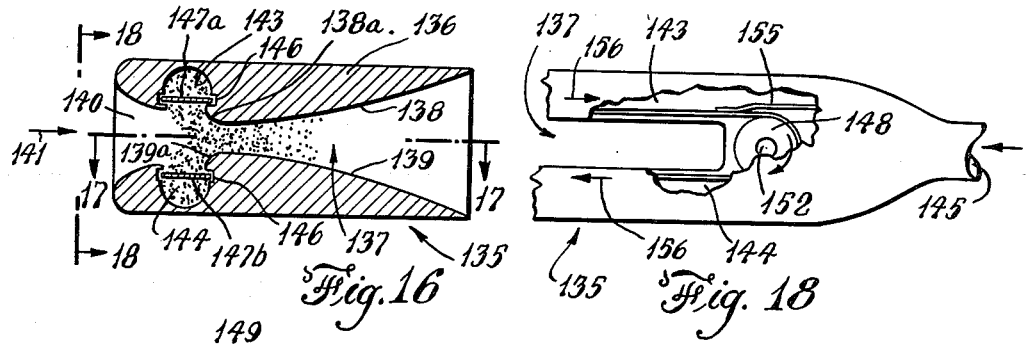
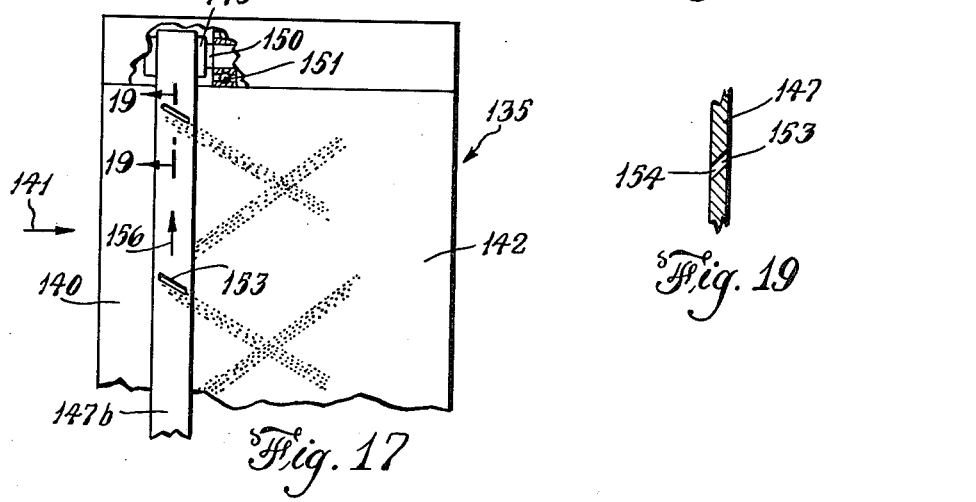
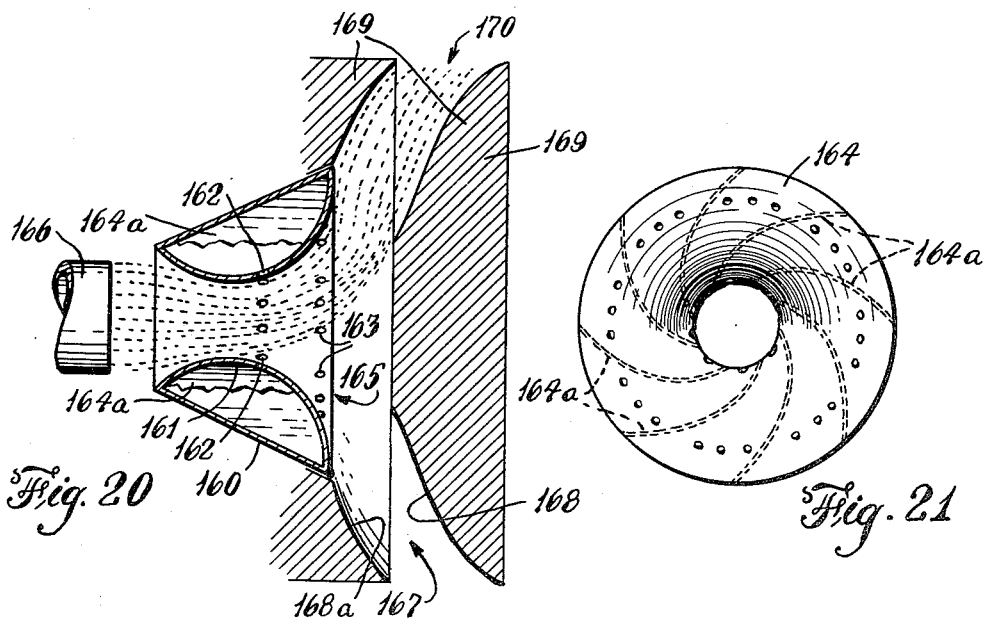

United States Patent Office 3,046,732
Patented July 31, 1962

3,046,732
METHOD OF ENERGY EXCHANGE AND APPARATUS FOR CARRYING OUT THE SAME
Joseph V. Foa, Troy, N.Y., assignor, by mesne assignments, to Research Corporation, New York, N.Y., a corporation of New York
Filed June 20, 1956, Ser. No. 592,642
48 Claims. (Cl. 60—35.6)

This invention relates to a method and apparatus for providing high efficiency energy transfer directly between a primary or driving fluid and a secondary fluid and more particularly to such a method and apparatus in which a stream of primary fluid is injected into a space occupied by the secondary fluid in one direction and is translated in another direction, with energy being mechanically transferred from the primary fluid directly to the secondary fluid independently of or in addition to energy exchange between the fluids characteristic of such transport phenomena as diffusion, convection or mixing.

My present application is a continuation-in-part of my application Serial Number 474,202, filed December 9, 1954, which in turn was a continuation of my application Serial Number 456,252, filed September 15, 1954, both applications being assigned to the assignee of my present application and are now abandoned.

Hitherto known methods of mechanical energy transfer from one flowing fluid to another fluid are conveniently summarized in three categories as (a) direct steady-flow transfer by mixing the fluids, (b) direct nonsteady-flow transfer by pressure waves, and (c) indirect transfer in dynamic machines. In those practical applications which permit comparison, method (a), the only one involving direct steady-flow transfer, is substantially less efficient than the other two methods. A full understanding of my present invention will be facilitated by describing briefly each of these methods here.

Method (a) represents the mechanism of operation of the ejector pump or thrust augmenter. In this method, a high-energy driving or primary flow and a low-energy driven or second flow are merged into a common duct in which they exchange momentum and energy by convection, diffusion and conduction. The flow emerging from the mixing duct is, ideally, homogeneous and its energy level is intermediate between the initial energy levels of the two flows. This process is highly dissipative, in that it involves the important entropy increments which are associated with heat transfer and with the conversion of the relative kinetic energy of bulk motion of the two flows to energy of random molecular agitation. Thus, an increase of the difference between the initial energy levels of the two flows will increase the amount of energy transferred (hence also the pumping action or thrust augmentation effect) but will decrease the efficiency of the transfer process. In most applications of practical interest, the efficiency of ejector pumps does not compare with those of conventional dynamic machines.

An operating example of method (b) is the nonsteady process of "internal augmentation" of the pulsejet. In this process the secondary flow is represented by the "backflow air" which is brought into the tailpipe of the engine by an upstream-propagating pressure wave. A large portion of the energy available in the hot combustion products, primary gas, is then transferred, by means of a backward-facing shock wave, to the cold backflow air. This process is known to be almost perfectly elastic and therefore very efficient, at least as long as the backward-facing shock is of moderate strength.

Method (c) is applied in a great variety of ways in compounded dynamic or positive-displacement machines. For example, in the turbo-charger, the energy extracted from one flow through a turbine is first converted to shaft work and then transferred, through a compressor, to another flow. In the engine-propeller, the energy extracted from the working fluid which flows through the engine is transferred, through the crankshaft, the reduction gears, the propeller shaft and the propeller blades, to the medium in which propulsion is generated. Within the engine itself, energy is transferred, through the crankshaft, from the hot combustion products to the fresh charge. Similar intermediate conversions are involved in the energy transfer mechanisms of gas turbines, turboprops, turbojets, cooling air turbines and many other compounded flow machines. In method (c), as in method (b), pressure signals act as energy-transfer vehicles within the fluids, either in the form of pressure waves (nonsteady-flow machines) or in the continuous regeneration of moving pressure fields (steady-flow machines). For this reason, the efficiency of energy transfer in compounded dynamic machines, despite the great number of intermediate conversions, is usually a good deal higher than that attainable by the direct transfer of method (a).

I have found that direct exchange of energy between two fluids or between portions of the same fluid may be effected in a manner which is not only considerably more efficient than conventional ejectors but which compares well with hitherto known pressure wave systems and also systems involving indirect transfer as in dynamic machines. Furthermore, inherent limitations of the pulsejet (direct nonsteady-flow energy transfer system) and systems involving indirect energy transfer between flows in dynamic machines are avoided. For example, the use of a turbine or equivalent device imposes an upper limitation on the capabilities of the apparatus due to the necessity of avoiding operating conditions which are beyond the strength of the materials of which the turbine is formed. Important additional advantages are obtained from the present process and apparatus for carrying out the same due to the fact that during initial phases of operation, the driving and driven fluid flows retain their identities and have velocities which facilitate separation of the two fluids.

It is, therefore, a principal object of this invention to provide a novel method and apparatus by means of which energy is transferred from a flowing fluid to another fluid characterized by an efficiency which is substantially higher than that hitherto attainable by direct, steady-flow ejector type systems and further characterized by the omission of moving parts which are included in dynamic machines wherein energy is transferred indirectly between two flows.

Another object is the provision of such a method for inducing the flow of a fluid, as well as apparatus for carrying out the same, having such enhanced efficiency in operation as to exceed that heretofore believed to be attainable in a process involving direct energy exchange between fluids and which is especially well adapted for use substantially wherever it is desired to transfer mechanical energy from a flowing fluid to another fluid.

A further object is the provision of apparatus for effecting the transfer of mechanical energy from one flowing fluid to another fluid which is substantially simpler than apparatus such as dynamic machines known hitherto in that not only are fewer moving parts required but high velocities of the boundaries of the interacting flows are attained without any mechanical parts partaking of comparable velocities.

Yet another object is the provision of a method and apparatus for effecting a highly efficient direct transfer of mechanical energy from one fluid to another and by means of which the fluids are readily separated one from the other after a desired exchange of energy is carried out.

In carrying out my method, a primary fluid is injected into an interaction space occupied by a secondary fluid, as for example through an orifice or nozzle which functions, with respect to said space, as a source of a stream or jet flowing in one direction. Additionally, the source of the stream is moved in a second direction as by linear or angular translation whereby the region occupied by the primary fluid in said space advances in the second direction and has a leading surface, represented by the boundary or interface between it and the region occupied by the secondary fluid that is inclined to said second direction at an angle. By "inclined" it is intended to exclude a 0° angle. However it should be noted that if the orientation is 90°, energy exchange characteristic of the present process is delayed until a second phase. The inclination of the interface to the second direction is determined chiefly by the velocity of the particles of the primary fluid (motion in said one direction) and the velocity of the source of the stream (motion in the second direction). During the initial phase of the process, the primary fluid entering the interaction space collides with the secondary fluid and forms a pattern in the interaction space discrete from the secondary fluid and moving relative thereto. The collision between successive increments of primary fluid entering the interaction space and the secondary fluid occurs along a path extending in the second direction. During this and the following second phase, the two fluid flows retain their identity and energy is transferred as represented by compression and movement of the secondary fluid in a third direction which is inclined to the aforementioned first and second directions.

As will be made apparent, the primary fluid entering the interaction space and the pattern formed thereby function in a manner which, in some respects, is similar to that of a blade formed of solid, that is to say abiding, material. As in the case of real blades or paddles, the "pseudo blades" formed in accordance with this invention may have more or less complex motions depending upon the apparatus utilized to carry out the process. For example, in one arrangement an essentially paddle-like effect is provided through the formation of at least one pseudo blade by injecting the primary fluid into the interaction space through an orifice which is translated linearly in a direction inclined to the direction in which the primary fluid is flowing as it exits from the orifice.

The function of a turbine, propeller or fan is provided by discharging the primary fluid as a stream or jet into an interaction space occupied by secondary fluid with the source or immediately preceding area from which the stream enters the space having an angular velocity about an axis. One suitable arrangement includes a rotor carrying a nozzle oriented so that it is skewed to the axis of rotation of the rotor and communicating with a source of primary fluid under pressure. The reaction of the issuing jet of primary fluid results in rotation of the rotor about its axis while the impact of the issuing jet on the adjacent secondary fluid creates a pressure field which compresses the secondary fluid and induces it to flow in a direction which, in any given instant, is inclined to the direction in which the nozzle is moving. The energy acquired by the secondary fluid in this process of flow induction is extracted entirely or partially from the primary fluid flow depending on whether the rotation of the rotor is produced and maintained solely by the reaction of the issuing jet or also by other means.

At every instant of such a steady process, the driving fluid which has emerged in an immediately preceding time interval from the orifice is found to occupy a region in space, which region advances in a direction chiefly determined by the motion of the orifice. Where the orifice or nozzle rotates as part of a rotor, the region occupied by the driving fluid rotates about the same axis and at the same angular velocity as the rotor and, although the fluid particles within this region do not follow this same motion, the boundaries of the region are interfaces separating the driving from the driven fluid with the relation of the interfaces to the induced flow pattern dynamically substantially like that of blade or vane surfaces of the same shape, rotating at the same angular velocity. Thus, the driving fluid forms a pseudo blade, the action of which on the driven fluid is somewhat similar to the flow induction process of solid blades or vanes in dynamic flow machines.

Depending upon whether the region occupied by the primary or driving fluid in the interaction space moves linearly or rotates, the flow induction apparatus may be likened to a dynamic machine having linearly or rotatably movable parts, to facilitate an understanding thereof. When the primary fluid issuing from a rotor orifice has no substantial component in the direction of the axis of rotation then it is helpful to consider the function of a radial flow dynamic machine. Where the stream issuing from the rotating orifice has an axial component such that its axis in its rotation describes a hyperboloid which is nearly a cylindrical surface, consideration of a turbine-propeller combination or, if the interaction space is shrouded, an axial-flow combination of turbine and fan or compressor or pump provides a helpful comparison.

In the present process, the transfer of energy which results from the collision of the two flows represents one phase of a complex process. After the initial transfer of energy to the driven fluid from the driving fluid when the two collide, unless the nature and state of the fluids in the two flows are the same, energy continues to be transferred between the flows across the interfaces during the course of any acceleration or receleration to which the two fluids may simultaneously be subjected, as when they flow through passages of varying cross-sectional area. This modified form of pressure exchange constitutes a second phase of energy transfer in which the direction of the transfer depends, for any given initial conditions, on the sign of the acceleration.

As will be made clear, I have found that the fluid for which the initial value of the ratio of its temperature to its molecular weight is greater transfers energy to the other or receives energy from it during the second phase, depending on whether the flow is accelerated or decelerated during the second phase. In certain applications the temperature of the driving fluid is normally higher than that of the driven fluid and their molecular weights are equal. Under such conditions the flow is accelerated during the second phase to gain a further favorable energy transfer. Where such an acceleration is not desirable as where it would lead to significant shock losses, the amplitude of the second phase may be minimized. Elimination of the second phase may be carried out in several ways including early separation of the two flows or the maintenance of a constant velocity in the double-flow system. In other applications such as when the sole purpose of the energy exchange process is to extract energy from the driving fluid, e.g., in air-cooling devices, the temperature of the driving fluid is generally lower than that of the driven fluid at the start of the second phase, and a further transfer of energy in the desired direction is obtained by decelerating the double flow after the first phase is completed.

As has been pointed out, the primary fluid is injected into the interaction space in the form of a stream or jet issuing from a source moving in a direction which is inclined to the direction in which the primary fluid particles are moving while the induced flow of the secondary fluid is in a third direction inclined to both of the first two directions. In other words, the two flows have differently oriented velocity vectors. Consequently, in one arrangement the interaction space is bounded by means defining two rows of passages one of which is oriented in the direction of motion of the driving fluid particles and the other is oriented in the direction of motion of the driven fluid particles whereby substantial separation of the two fluids is effected by each flowing out through that row of passages disposed to match the orientation of its motion. Such an arrangement is especially well suited for applications in which the fluids move at high speeds. Separation of the two fluids may also be carried out by means of properly oriented outflow ports formed in a bounding wall of the interaction space which has the same velocity as the orifice through which the primary fluid is injected into the space and therefore the same velocity as the pattern or pseudo blade formed by the primary fluid.

In the case of the rotating pattern formed by the primary fluid stream injected into the interaction space through a nozzle carried on a rotor, the pseudo blade pattern is stationary in a frame of reference which is fixed to the rotor. The outflow ports are formed in a portion of the interaction space enclosure which rotates with the rotor either by being connected thereto or by other suitable means. The properties of materials available for use in forming the required parts limits the use of such an arrangement to those applications which involve low or moderate tip speeds of the pseudo blades since in such an arrangement the member having the outflow ports formed therein rotates at the same speed.

A further exchange of energy takes place through heat transfer and mixing. This phase, which is generally responsible for important losses, starts, like the other two, with the formation of the interfaces but proceeds at a slower rate. When desired, the third phase energy exchange may have a negligible effect through checking its progress at an early stage by separating the two flows after the interfaces have progressed only a moderate distance from their origin. Under certain conditions, following separation, the flows may be remerged after their relative velocities have been modified to provide a desired further energy transfer therebetween during the third phase.

Further objects as well as advantages of the present process as well as the apparatus for carrying out the same will be apparent from the following description and the accompanying drawings in which FIGURE 1 is a diagrammatic representation of the propagation of an interface between the flows in the interaction space;

FIGURE 4 is a cross-sectional view along the line 4—4 of FIGURE 3;

FIGURE 5 is an elevational view, partially diagrammatic of an unshrouded system;

FIGURE 6 is a similar view but partially in section of a modification of the apparatus shown in FIGURE 5;

FIGURE 10 is a sectional view, partially in elevation, of another type of apparatus for carrying out the method of this application;

FIGURE 11 is an elevational view of a modification of the apparatus of FIGURE 10 with a portion of the exit ducts cut away to expose the interior thereof;

FIGURE 12 is a sectional view, partially in elevation, of a jet engine or gas generator constructed in accordance with this invention;

FIGURE 13 is a sectional view along the line 13—13 of FIGURE 12;

FIGURE 14 is a fragmentary view from the point of view of line 14—14 of FIGURE 12 with portions of the outer shell and the next inner shell broken away;

FIGURE 15 is a sectional view along the line 15—15 of FIGURE 14; the line 15—15 in FIGURE 14 serving to orient the figure with respect to FIGURE 14;

FIGURE 16 is a sectional view of a further embodiment of apparatus suitable for carrying out the present method;

Figure 22:
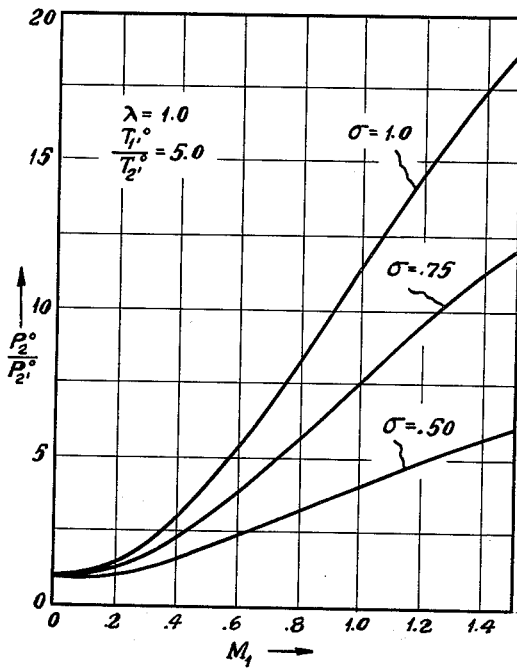
Figure 23:
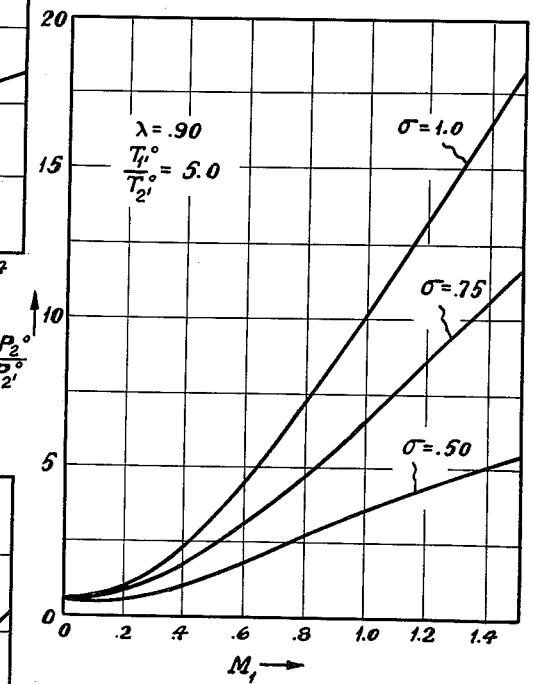
Figure 24:
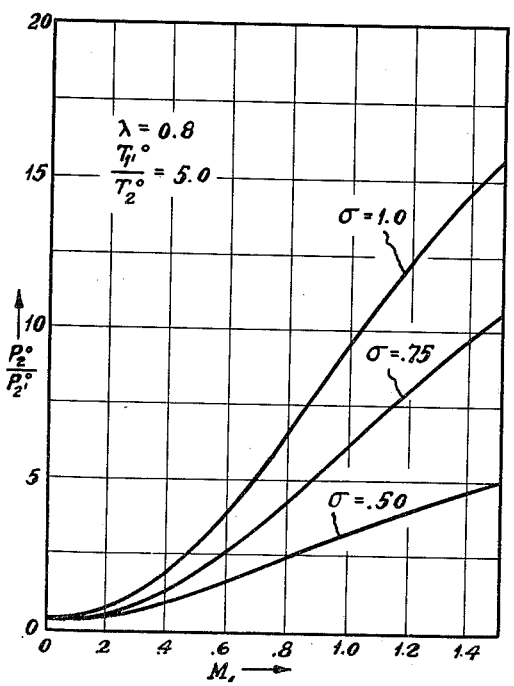

FIGURES 17 and 18 are sectional views through the lines 17—17 and 18—18 respectively of FIGURE 16;

FIGURE 19 is a fragmentary sectional view showing the orientation of one of the orifices and taken along the line 19—19 of FIGURE 17;

FIGURES 20 and 21 are respectively sectional and end elevational views of another form of device for propagating a jet having rotational motion;

FIGURES 22, 23 and 24 are graphs illustrating the relative performance capabilities of the present method and apparatus.

As will be made evident, the present method as well as the appartus for carrying out the same lend themselves to a wide variety of uses and substantially wherever a transfer of energy from a flowing fluid to another fluid occurs. It is to be understood that the term "fluid" is used herein, and is intended to include, in addition to gases and liquids with or without solid particles suspended therein, any aggregate of solid particles, as for example sand, which may be made to flow.

Figure 1:
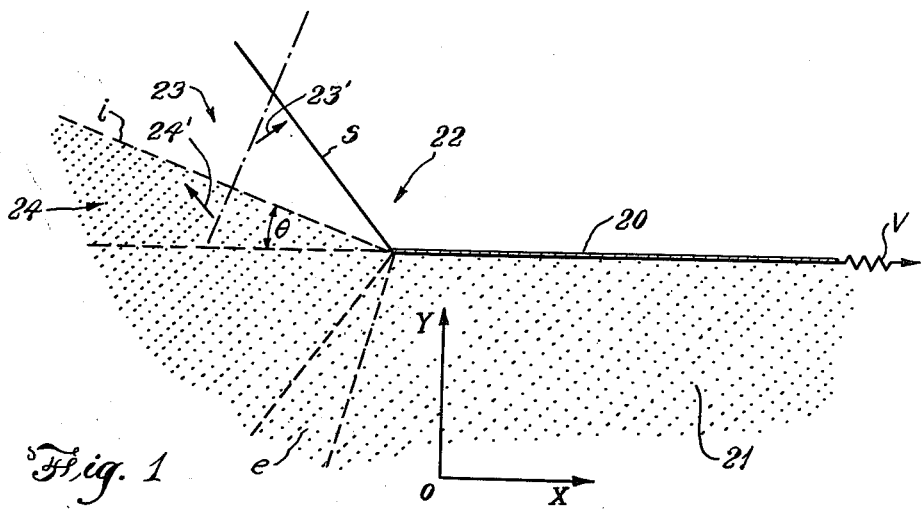
FIGURE 1a is a diagram correlated to FIGURE 1 involving compressible gases and showing the relative velocities of primary and secondary fluids with respect to a stationary or first frame of reference and to a moving or second frame of reference fixed to the plate 20.

Turning now to FIGURE 1, plate 20 separates two fluids 21, 22 and is mounted for movement in its own plane. The best presently available simplified explanation of the present process may be derived when it is assumed that plate 20 is infinitely thin, half-infinite in length and that fluids 21, 22 are non-viscous gaseous media initially at rest relative to an observer O. Gas 21, the primary or driving fluid has an initial pressure higher than gas 22 and the area occupied by the former is shown dotted in the drawing. As plate 20 is moved in its own plane at a velocity V, indicated by arrow V, assumed in this instance to be supersonic relative to both gases, successive layers of primary gas 21 expand into the space initially occupied by secondary gas 22.

At any time, $t$ the expanded primary gas occupies a wedge-shaped region, the leading edge of which, coinciding with the trailing edge of the plate, advances with the velocity V. As far as the secondary fluid is concerned, the interface $i$ between primary and secondary gas is equivalent to the surface of a solid wedge of the same wedge angle $\theta$ and moving at the same velocity. Thus, the same shock S is produced ahead of this interface in the secondary gas as would be produced by a solid wedge of the same shape at the same Mach number. Similarly, the same centered expansion wave $e$ is propagated into the primary gas as would be produced in the Prandtl-Meyer expansion of this gas at the same initial Mach number past a solid convex corner of the same angle $\theta$.

To an observer O', moving with the plate, the flow is isoenergetic and stationary throughout. On the other hand, the energy level of the secondary gas, relative to observer O, is higher in region 23 between the shock wave and the interface than ahead of the shock. It is to be noted that the frame of reference hereinafter referred to as being fixed to the stationary parts of the machine corresponds in FIGURE 1 to the frame of reference of the stationary observer O. The frame of reference referred to as being fixed to the rotor of the like moving parts and therefore moving therewith corresponds to the frame of reference of the observer O' moving with the plate 20. The secondary gas in region 23 possesses not only a higher internal energy than in the initial state but also a kinetic energy relative to observer O which it did not possess in the initial condition. Since no work is required to move the plate, the two fluids having been assumed to be inviscid, it follows that the energy acquired by the secondary gas is energy extracted from the primary gas. The energy level of the primary gas in the expanded region 24 is correspondingly lower, relative to the same observer O, than in the initial condition. Thus energy is being transferred from the primary to the secondary gas.

As far as the motion of the two gases in regions 23 and 24 is concerned, it is clear that their total momentum in the x-direction, the direction of motion of the plate, relative to observer O, must be zero, by virtue of their initial condition of rest and of the fact that no force is required to move the plate in its own plane under the assumed conditions. On the other hand, since the secondary gas in region 23 is moving in the direction of propagation of the shock, its velocity in this region has a positive x-component. Therefore, the x-component of the velocity of the expanded primary gas, relative to observer O, is negative. Thus, in the situation of FIGURE 1, the wedge produced by the expanding primary gas is moving toward the right, but the particles within it are moving toward the left. Thus, in FIGURE 1, the first, second and third directions referred to hereinabove are indicated respectively by arrows 24', V and 23' while the angle of inclination is the angle $\theta$.

In dealing with subsonic situations, the flow field is not as easily mapped as with supersonic situations, but the physical argument with regard to the mechanism of energy transfer is substantially the same; and a similar reasoning may be applied to the more complex cases of rotational motion.

Figure 3:
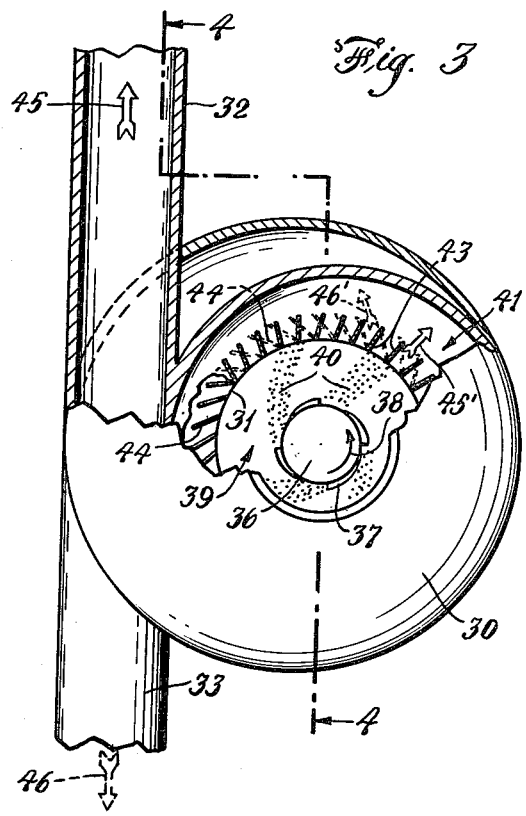
FIGURE 3 is a plan view, partially in section, of a radial flow apparatus.

Referring now to FIGURES 3 and 4 in detail, an annular casing 30 has two volute portions separated by an annular wall 31 which communicate with independent exit ducts 32, 33 respectively. As most clearly shown in FIGURE 4, casing 30 has a pair of axial, mutually opposed inlet conduits or pipes 34, 35. A primary or driving fluid is led through conduit 34 from a suitable source (not shown) to a rotor 36 which may be in the form of a freely rotatable body mounted on the inner end portion of conduit 34 and provided with a plurality of circumferentially spaced orifices 37 which afford communication in the radial direction between the interior and exterior of rotor 36. Orifices 37 are so oriented in the wall of rotor 36 that the rotor is rotated in the direction of arrow 38 due to the flow of the primary fluid therethrough and the reaction of the issuing stream or jet.

The interior of conduit 35 communicates with the space 39 immediately adjacent the exterior of rotor 36; the space 39 constituting an interaction region in which energy is transferred from the primary, driving, flow to the secondary, driven flow. The fluid exiting through orifices 37 into space 39, in any given instant occupies regions 40, shown dotted in the drawings, one for each orifice and each in the shape of a spiral suggestive of the term pseudo blades which serves as a convenient designation for such regions. Partition wall 31 separates the radial outer portion of the space about rotor 36 into two annular areas 41, 42 about which there are mounted a plurality of vanes 43, 44 arranged in respective circumferential arrays. Vanes 43 form passages on one side of wall 31 which are substantially parallel to the direction of motion of the particles in pseudo blades 40 through which the particles pass on their way to duct 32. Solid arrows 45 indicate the general direction of travel of the pseudo blade particles, that is, the particles of the primary fluid. Vanes 44 are inclined so as to extend substantially parallel to the direction of motion of the particles in the induced or driven flow and define passages through which the induced flow particles enter area 42 which in turn leads to exit duct 33. Arrows 46, shown in broken lines, indicate the general direction of travel of the particles of the induced flow.

Vanes 43, 44 are oriented to take advantage of the difference in the velocities of the primary and secondary fluid particles so as to effect separation thereof before any appreciable mixing may take place and to minimize the effect of second and third phase energy transfer between the fluids.

In operation, driving fluid under pressure passes along pipe 34 from right to left, FIGURE 4, and is injected through nozzles 37, the axes of which are each skewed to the axis of rotation of rotor 36. The reaction of the issuing jets maintains rotor 36 in rotation about its axis. Each issuing jet forms a pseudo blade pattern occupying a region 40 which rotates about the same axis and at the same angular velocity as rotor 36. The secondary or driven fluid is compressed and induced to flow under the impact of each issuing jet so that the fluid in conduit 35 is induced to flow from left to right, FIGURE 4. Due to the differences in orientation of vanes 43 and 44, the latter appears as an obstruction to the primary fluid flow so that it passes to the left of partition 31, as viewed in FIGURE 4. Similarly, the secondary or induced flow sees vanes 43 as an obstruction and passes to the right of the partition. The directed, as distinguished from random, motion of the induced flow in the interaction space results since a normal drawn to the advancing boundary or interface between the primary and secondary fluids from the point where they initially collide has a component in the radially outward direction in which it is desired that the secondary fluid flow. This is apparent from FIGURE 3 where the interfaces formed along the advancing boundaries of regions 40 are each shown inclined, even at the point of emergence of the jets into interaction space 39, to the direction in which the orifices of nozzles 37 are translated.

The present method of energy exchange between fluids as carried out by the apparatus of FIGURES 3 and 4 may be utilized for a variety of purposes including super charging, pumping or cooling. In the latter instance, the fluid to be cooled is used as the driving fluid.

Figure 2:
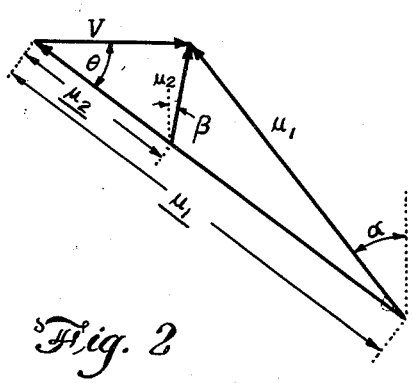
FIGURE 2 is a velocity diagram of a first-phase condition.

The effect of the present process as carried out by apparatus such as that of FIGURES 3 and 4 may be calculated with reference to the velocity diagram of FIGURE 2 which shows a typical first phase condition where V is the peripheral velocity of the interface at an arbitrary station on the interface at a constant distance from an orifice 37 and $\theta$ is its local angular inclination to the peripheral direction. Subscripts 1 and 2 refer to the driving and to the driven fluid, respectively. The vectors $u_1$ and $u_2$ represent the local velocities of the two fluids relative to the interface. Vectorial addition of V to $u_1$ and $u_2$ yields the vectors $u_1$ and $u_2$, which represent the velocities of the two fluids relative to the stationary parts of the machine. Assuming for the moment that the two fluids are incompressible, the first-phase transfer can be calculated from the relative magnitude of these vectors.

The velocity diagram of FIGURE 2 relates to a system of two incompressible fluids with the mass flow ratio $\mu = \dot{m}_2/\dot{m}_1 = 11.65$, without external torque applied to the rotor. Let $E_i$ denote the total rate of flow of available mechanical energy through the intake, i.e., the kinetic and available potential energy carried by the two flows through the inlet of the flow-induction device in the unit of time. Taking the pressure in regions 23 and 24 as the reference pressure level, the energy equation reduces to $$1/2(u_1^2 + \mu u_2^2) = \frac{E_i}{\dot{m}_1} \qquad (1)$$

The condition that the angular momentum of the two flows be zero is expressed by the equation $$u_1 \sin \alpha = \mu u_2 \sin \beta \qquad (2)$$

Furthermore, from the law of sines $$\frac{V}{\sin(90°-\theta-\alpha)} = \frac{u_1}{\sin \theta} \qquad (3)$$

$$\frac{V}{\sin(90°-\theta+\beta)} = \frac{u_2}{\sin \theta} \qquad (4)$$

Taking $$V = .432\sqrt{\frac{E_i}{\dot{m}_1}} \text{ and } \theta = 37°$$

the above equations yield $$\alpha = 38°; \quad \beta = 10°20'$$

$$u_1^2 = \mu u_2^2 = \frac{E_i}{\dot{m}_1}$$

Thus, if in the system under consideration all the energy input were carried by the driving flow, 50% of this energy would be transferred to the driven fluid in the non-dissipative first phase of the exchange process.

Furthermore, elementary trigonometric considerations yield $$\underline{u_1} = 1.321\sqrt{\frac{E_i}{\dot{m}_1}}$$

$$\underline{u_2} = 0.486\sqrt{\frac{E_i}{\dot{m}_1}}$$

The ratio between the momentum in the desired direction of flow induction of both fluids and the total momentum of the two flows is $$\frac{u_1 \cos\alpha + \mu u_2 \cos\beta}{u_1 + \mu u_2} = 0.94$$

indicating that the momentum loss under ideal conditions is 6%.

An energy transfer process involving compressible fluids is illustrated in the following numerical example. Here, the fluid is air on both sides of plate 20. For simplicity, changes of specific heats will be neglected, but their ratio is assumed to be 1.4 throughout. The initial static temperatures will be assumed to be $T_{1'} = 2500$ °R and $T_{2'} = 500$ °R and the initial static pressures $p_{1'} = 7780$ lb./sq. ft. and $p_{2'} = 2000$ lb./sq. ft. Finally the velocity of the plate will be assumed to be $V = 2470$ ft./sec.

With these assumptions, and denoting Mach numbers by M, stagnation parameters by the superscript $o$ and quantities measured by the observer O' who is moving with the plate by an underlining bar, one has $\underline{M_{1'}} = 1.0$, $\underline{M_{2'}} = 2.25$, $\underline{T_{1'}^o} = 3000$ °R and $\underline{T_{2'}^o} = 1000$ °R. With static-pressure and velocity-orientation matching conditions across the interface, $\theta = 12°$, $p_1 = p_2 = 4000$ lb./sq. ft., $\underline{u_1} = 3360$ ft./sec., $\underline{u_2} = 2180$ ft./sec., $\underline{T_1} = 2080$ °R and $\underline{T_2} = 610$ °R. It can be verified that the change of state is substantially isentropic not only on the expansion but also on the compression side.

Figure 1A:
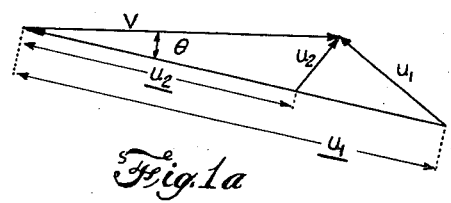

Vectorial addition of V to $\underline{u_1}$ and $\underline{u_2}$ yields the velocities $u_1$ and $u_2$ relative to the observer at rest, as in FIGURE 1a.

From the law of cosines, one obtains $u_1 = 1086$ ft./sec. ($M_1 = .485$) and $u_2 = 583$ ft./sec. ($M_2 = .481$), hence $T_1^o = 2180$ °R and $T_2^o = 638$ °R.

The mass flow ratio $$\mu = \frac{u_2 T_1}{u_1 T_2} = 2.22$$

A special situation is that of an interacting gaseous system with $\mu = 1.0$, i.e., equal mass flow rates. In this case, the x-components of $u_1$ and $u_2$ are approximately equal. From the velocity vector diagram of FIGURE 2 it is seen that under these conditions, the ratio $u_2/u_1$ approaches 1.0 as V increases and $\theta$ accordingly decreases. In radial-flow systems, where the peripheral speed of the pseudo-blades can be very high, the ratio $u_2/u_1$ may be brought close to this ideal value. In general, since $p_2 = p_1$, the ratio of the stagnation pressures is (with $\gamma_1 = \gamma_2$), $$\frac{p_2^o}{p_1^o} = \left(\frac{1 + \frac{\gamma-1}{2}M_2^2}{1 + \frac{\gamma-1}{2}M_1^2}\right)^{\frac{\gamma}{\gamma-1}} \quad (5)$$

Letting $u_2^2/u_1^2 = \sigma$ with $\sigma$ less than 1.0 and $\gamma$ having been assumed to be the same for both gases, $$\frac{M_2^2}{M_1^2} = \sigma\frac{W_2 T_1}{W_1 T_2} \quad (6)$$

where W denotes molecular weight. It follows that the stagnation pressure ratio produced by the first phase exchange may be well in excess of 1.0 if the driving fluid is a gas of low molecular weight at high temperature and the driven fluid a gas of high molecular weight at low temperature.

When the same fluid is employed in both flows, only the temperature effect is present. Using primes (') again to denote conditions immediately before the start of the first phase, and neglecting changes of specific heats, the energy equation is $$T_2^o - T_{2'}^o = T_{1'}^o - T_1^o \quad (7)$$

where, for substantially isentropic wave processes, $$T_{2'}^o = T_2^o\left(\frac{p_{2'}^o}{p_2^o}\right)^{\frac{\gamma-1}{\gamma}} \text{ and } T_{1'}^o = T_1^o\left(\frac{p_{1'}^o}{p_1^o}\right)^{\frac{\gamma-1}{\gamma}} \quad (8)$$

Now, let $p_1^o = \lambda p_2^o$, with $\lambda$ equal to or less than 1.0. This relation becomes significant in a "loop" arrangement, whereby the driven fluid, after being compressed in the energy exchange process, is further energized by heat addition until its stagnation temperature is raised to $T_{1'}^o$ and then led to form the driving flow. Thus $(1-\lambda)p_2^o$ represents the stagnation pressure drop due to flow losses and heat addition.

Equations 5, 6, 7 and 8 yield, $$\frac{p_2^o}{p_{2'}^o} = \left\{Z + \left[Z^2 + \frac{\sigma}{\lambda^{\frac{\gamma-1}{\gamma}}}\frac{\gamma-1}{2}M_1^2\frac{T_{1'}^o}{T_{2'}^o}\left(1 + \frac{T_{1'}^o}{T_{2'}^o}\right)\right]^{1/2}\right\}^{\frac{\gamma}{\gamma-1}} \quad (9)$$

with $$Z = 1/2\left[1 + \frac{T_{1'}^o}{T_{2'}^o}\left(1 - \frac{1 + (1+\sigma)\frac{\gamma-1}{2}M_1^2}{\lambda^{\frac{\gamma-1}{\gamma}}}\right)\right]$$

This relation is plotted, for air ($\gamma = 1.4$) and $T_{1'}^o/T_{2'}^o = 5$, in FIGURES 22, 23 and 24.

The second phase of energy exchange is assumed to take place, like the first one, within a time interval that is short enough to make it permissible to neglect the concurrent effects of heat transfer and mixing. The exchange process will accordingly be assumed to be isentropic also in this phase.

The second phase exchange results from the flow accelerations or decelerations which may be associated with changes of cross-sectional area of the double-flow system. The magnitude of the second phase effect may be evaluated with reference to a gaseous system. Subscripts $i$ and $f$ are used to denote initial and final conditions of this phase, respectively. At each station, the two fluids are assumed to be at the same pressure and to be flowing at the same velocity, as a result of an ideal first phase exchange. The specific heat ratio $\gamma$ will be assumed to be the same for both fluids.

With these conditions, the energy equation yields $$c_{p1}T_{f1} + \mu c_{p2}T_{f2} + (1+\mu)\frac{u_f^2}{2g} = c_{p1}T_{i1} + \mu c_{p2}T_{i2} + (1+\mu)\frac{u_i^2}{2g} \quad (10)$$

where $c_p$ is the specific heat at constant pressure. Furthermore, from the condition that the changes of state be isentropic and that the pressures of the two fluids be the same at each station, one has $$\frac{T_{f1}}{T_{i1}} = \frac{T_{f2}}{T_{i2}} \quad (11)$$

From Equations 10 and 11, one obtains, for the change of stagnation enthalpy of the driving fluid, $$c_{p1}(T_{i1}{}^\circ - T_{i1}{}^\circ) = c_{p1}T_{i1} + \frac{u_f^2}{2g} - c_{p1}T_{i1} - \frac{u_i^2}{2g}$$

$$= \frac{\mu(c_{p1}T_{i1} - c_{p2}T_{i2})}{(c_{p1}T_{i1} + \mu c_{p2}T_{i2})} \frac{(u_f^2 - u_i^2)}{2g} \quad (12)$$

Equation 12 relates the magnitude and direction of the second phase transfer of energy to the velocity change of the aggregate flow and to the molecular weights and initial temperatures of the two fluids. When the molecular weights of the two fluids are equal, the fluid which is initially at the higher temperature transfers energy to the other fluid or receives energy from it during the second phase, depending on whether the flow is accelerated or decelerated during this phase. This equation provides useful design criteria for the ducting system. For example, in the "loop" arrangement which was referred to in connection with the first phase exchange, the temperature of the driving fluid is always higher than that of the driven fluid. It is therefore desirable, with this arrangement, that the flow be accelerated during the second phase. Where such an acceleration would lead to important shock losses, the second phase should be eliminated altogether, either by early separation of the two flows or by the maintenance of a constant velocity in the double-flow system. On the other hand, when the sole purpose of the exchange process is to extract energy from the driving fluid (as, e.g., in air-cooling devices), the temperature of the driving fluid will generally be lower than that of the driven fluid at the start of the second phase, and a further transfer of energy in the desired direction may be obtained by decelerating the double flow after the first phase is completed.

The cross-sectional area change that is required to produce a desired change of velocity may be calculated even when one of the two flows is initially supersonic and the other initially subsonic. Denoting cross-sectional areas by $A$, the continuity equation and the isentropic condition may be combined to form the relation $$\frac{A_i}{A_f} = \frac{u_f}{u_i}\left(\frac{p_f}{p_i}\right)^{\frac{1}{\gamma}} \quad (13)$$

Again from the isentropic condition, and from Equations 10 and 11, one obtains.

$$\frac{p_f}{p_i} = \left(\frac{T_{f1}}{T_{i1}}\right)^{\frac{\gamma}{\gamma-1}} = \left(\frac{T_{i1} + \mu T_{i2} + (1+\mu)\frac{u_i^2 - u_f^2}{2gc_p}}{T_{i1} + \mu T_{i2}}\right)^{\frac{\gamma}{\gamma-1}} \quad (14)$$

Here molecular weight and specific heat have been assumed to be constant throughout for convenience. Equations 13 and 14 yield $$\frac{A_i}{A_f} = \frac{u_f}{u_i}\left[1 + \frac{u_i^2 - u_f^2}{2gc_p T_{iav}}\right]^{\frac{1}{\gamma-1}} \quad (15)$$

where $T_{iav}$ is the mass average of the initial static temperatures, or $$\frac{A_i}{A_f} = \frac{u_f}{u_i}\left[1 + \frac{\gamma-1}{2}\overline{M}_i^2\left(1 - \frac{u_f^2}{u_i^2}\right)\right]^{\frac{1}{\gamma-1}} \quad (16)$$

where $\overline{M}$ is an equivalent Mach number, defined as $\overline{M} = $ $$\frac{u}{\sqrt{(g\gamma R T_{av})}}$$

For an infinitesimal transformation, Equation 16 reduces to $$\frac{dA}{A} = (\overline{M}^2 - 1)\frac{du}{u} \quad (17)$$

From Equation 17 it is seen that when $\overline{M}$ is greater than 1.0, a diverging duct produces an acceleration of the double flow while with $\overline{M}$ less than 1.0 a diverging duct produces a deceleration of the flow. When the desired transfer of energy during the second phase requires an acceleration of the flow and the equivalent Mach number $\overline{M}$ is greater than 1.0, a diverging duct may be utilized to provide the required acceleration. When the initial value of $\overline{M}$ is less than 1.0 a converging duct may be provided to the point where $\overline{M}$ becomes equal to 1.0 and a diverging duct downstream from that point. Thus the rate of area change required to produce any desired velocity gradient at any station is found to be related to the local equivalent Mach number in the same manner as it is related to the local Mach number in isentropic single-flow systems.

Heat transfer, diffusion and mixing are the major sources of entropy increments in the present process. Although the pertinent transport rates are low enough to permit separation of the two flows before the production of entropy has progressed very far, there are cases in which separation is either impracticable or undesirable. The effect of these transport phenomena on the overall economy of the energy exchange process depends on the relative velocities which are established in pressure exchange. For example, assuming that the two fluids are incompressible and mixing takes place at constant pressure, the mixing loss is represented, in full, by the dissipation of the kinetic energy $$1/2 \frac{\dot{m}_1 \dot{m}_2}{(\dot{m}_1 + \dot{m}_2)}(\Delta u)_i^2$$

where $(\Delta u)_i$ is the difference between the initial velocities of the two streams relative to the interface. The value of $(\Delta u)_i$ depends on the details of the early phases of the energy exchange process. Once the magnitude of this loss is known, the overall efficiency of the energy transfer process, through the pressure exchange phases and the final complete mixing, can easily be computed.

The following recapitulation of the symbols used in the foregoing equations is included for ready reference:

$A$   cross sectional area
$c_p$   specific heat at constant pressure
$E_i$   rate of flow of available mechanical energy through the intake of the exchanger
$g$   acceleration of gravity
$\dot{m}$   mass flow rate
$M$   Mach number in frame of reference fixed to stationary parts of the machine
$\underline{M}$   Mach number in frame of reference fixed to the rotor
$\overline{M}$   equivalent Mach number
$p$   pressure
$R$   gas constant
$T$   temperature
$u$   flow velocity in frame of reference fixed to stationary parts of the machine
$\underline{u}$   flow velocity in frame of reference fixed to stationary
$W$   molecular weight
$\alpha_1 \beta_1 \theta$   angles
$\gamma$   ratio of specific heats
$\lambda$   loss factor $$\mu = \frac{\dot{m}_2}{\dot{m}_1}$$

$\sigma - u_2^2/u_1^2$

Subscripts:
1   primary (driving) fluid or flow
2   secondary (driven) fluid or flow
$f$   end of second phase
$i$   beginning of second phase Superscripts:
$o$   stagnation conditions
$'$   conditions immediately preceding the energy exchange As thus far described in connection with FIGURES 3 and 4 the induced flow is substantially entirely radial. Further advantages which render the present invention especially well suited to a wide variety of applications are provided by imparting a motion to the induced flow which is predominantly axial with respect to the axis about which the pseudo blades are propagated. Referring now to FIGURE 5, propulsion unit 50 comprises a pipe 51 on which head 52 is rotatably mounted. One or more discharge nozzles or orifices 53 are spaced circumferentially about head 52 and are so disposed that the axes of the jets issuing therefrom are inclined with respect to a plane normal to the axis of rotation of head 52. Pipe 51 communicates with a source of driving fluid which, flowing in the direction of arrow 54 exits through orifices 53 to form pseudo blades which rotate at the same angular velocity as the orifices and induce axial flow of the surrounding fluid, increasing the pressure on the downstream side of the head and reducing it on the upstream side. The resultant of these pressure forces is a propelling force acting in the direction of the lesser pressure and a thrust is developed in this direction. In the present instance unit 50 may be propelled by such thrust. The driving fluid exiting through the orifices, being jets, provides impulses which add to the effect.

In FIGURE 6 unit 55 comprises casing 56 having an annular opening provided between spaced, oppositely disposed rings 57, 58. Radially inwardly of rings 57, 58, rotor 59 is mounted coaxially with casing 56 and for rotation about the axis in bearings 59a supported in the casing as shown. Rotor 59 is a substantially hollow body provided with circumferentially spaced orifices 60 which communicate through the interior of rotor 59 with pipe 61, the latter communicating, in turn, with a source of driving fluid under pressure. Rings 57, 58 are mounted for limited axial displacement so that each may be positioned so as to be inserted more or less into the jets emerging from orifices 60. Means for selectively positioning the rings may include rods 62 and suitable actuators 63 which may be electrical motors or hydraulic jacks. As shown, rings 57, 58 have curved external surfaces which may function as airfoils. Partial insertion of the curved surface of ring 57 into the emerging jets causes the jets to form pseudo blades which are deflected in a rearward direction, to the right as viewed in FIGURE 6, thereby producing a thrust in the forward direction. Thrust reversal is accomplished by displacing both rings rearwardly, thereby inserting ring 58 into the emerging flow while removing ring 57 therefrom. Orientation of the thrust vector may be changed and controlled by angular displacement of rings 57, 58 about axes perpendicular to the axis of rotation of rotor 59. Such angular displacement disturbs the symmetry of the pseudo blade pattern and provides a convenient manner in which the direction or attitude of the unit may be controlled. Instead of the driving fluid being supplied under pressure through pipe 61, it may be energized by a pump or gas generator mounted within casing 56.

The present process as carried out by the apparatus of FIGURE 6 includes the step of injecting the primary fluid in the form of a plurality of circumferentially spaced streams into the annular space between rings 57 and 58 with the axis of each stream inclined to the direction in which its orifice 60 is being translated. Then, to provide axial thrust, the streams are inclined either rearwardly or forwardly relative to the axis depending upon whether ring 57 or ring 58 is inserted into the streams. As indicated at 64 the pseudo blades, with ring 57 inserted, are propagated axially rearward, each forming a helicoidal pattern about the casing.

Figure 7:
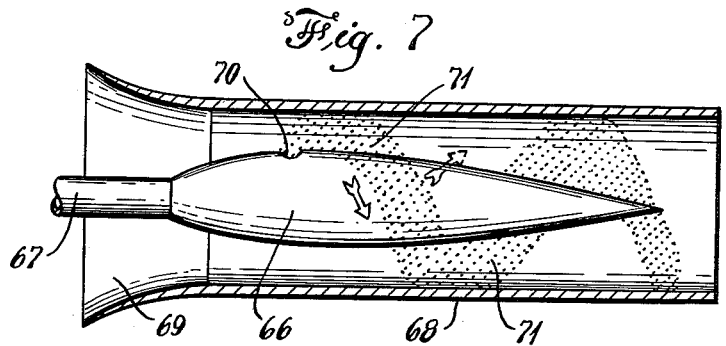
FIGURE 7 is a sectional view, partially in elevation, of a shrouded system.

The interaction space of the axial-flow system shown in FIGURE 7 is advantageously shrouded to provide a combination turbine and axial-flow fan, pump, compressor or the like. Here, rotor 66 is mounted for rotation on pipe 67 through which it communicates with a source (not shown) of primary fluid under pressure. Tubular member 68 may be supported in any convenient manner and has a cylindrical portion which encircles rotor 66. The inlet end portion 69 of tubular member 68 is tapered outwardly as shown. In rotor 66, a single orifice 70 is formed by walls inclined relative to the axis of the rotor so that the primary fluid passing from pipe 67 into rotor 66 and exiting through orifice 70 not only causes the rotor to rotate about its axis but itself has an axial velocity component thereby forming a helicoidal pseudo blade as indicated at 71. The pseudo blade advances to the right, as viewed in FIGURE 7, creating a low pressure region which induces a flow of secondary or driven fluid into inlet 69. The secondary fluid, air or other surrounding fluid, is trapped between the turns of the pseudo blade and the confining walls of tubular member 68, compressed and forced out the discharge end of tubular member 68. It will be appreciated that the pseudo blade pattern 71 is diagrammatic and shown thus for purposes of illustration. In practice, the axial spacing of the successive turns of the pseudo blade depends upon a number of variables including the initial velocities of the fluids and the radial distance between rotor 66 and tubular member 68.

As is clearly apparent in FIGURE 7, the interaction space between tubular member 68 and rotor 66 has a transverse cross-sectional area which increases from left to right, the direction in which both fluids flow. In this way, when $\overline{M}$ is less than 1, the double flow system is decelerated to provide a transfer of energy from the primary to the secondary fluid where the temperature of the primary fluid is lower than that of the secondary fluid at the start of the second phase.

Figure 8:
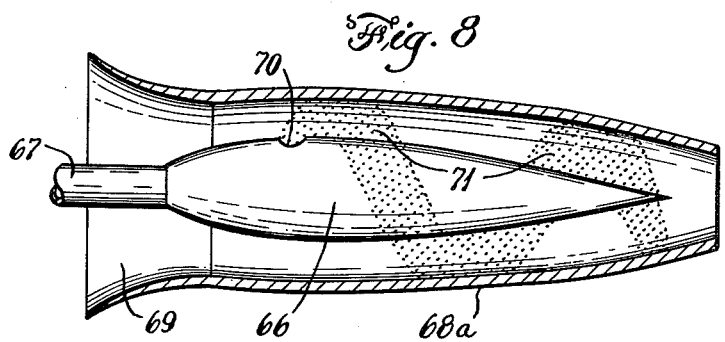
FIGURE 8 is a sectional view, partially in elevation, of a modification of the apparatus of FIGURE 7.

In FIGURE 8, an arrangement similar to that shown in 7, rotor 66 is enclosed by a shroud 68a of tapered configuration such that the cross-sectional area of the interaction space between the rotor and the shroud decreases from left to right. The apparatus of FIGURE 8 is the same in all other respects to that shown in FIGURE 7, similar reference characters having been used to designate like parts. Here, the double flow system is accelerated to provide a favorable energy transfer from a higher temperature driving fluid to a lower temperature driven fluid when the equivalent Mach number is less than 1.0.

Figure 9:
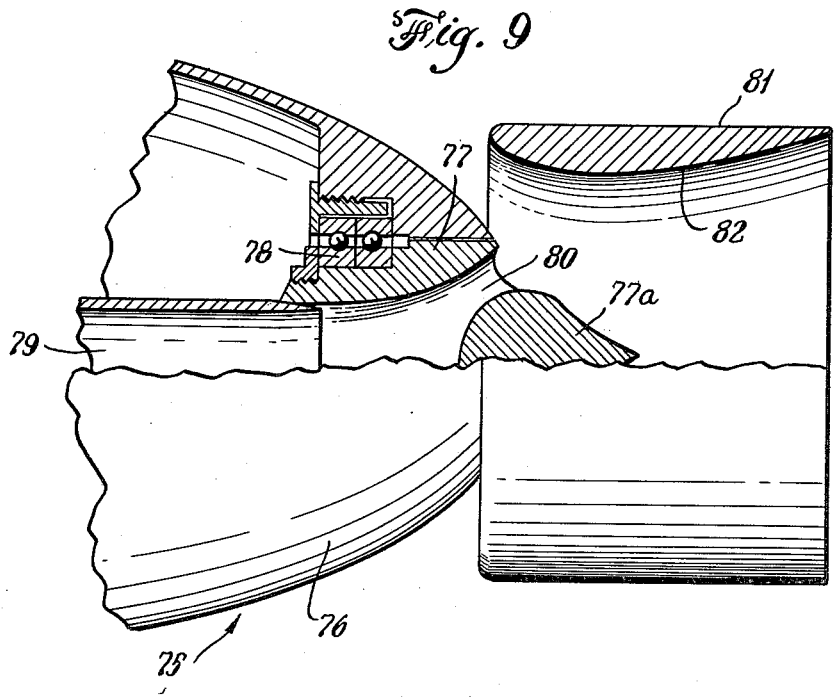
FIGURE 9 is an elevational view partially broken away of a further modification of the apparatus shown in FIGURE 5.

Propulsion device 75, FIGURE 9, comprises a tapered, annular casing 76 in one end of which rotor 77 is mounted, supported by bearings 78 for rotation about its axis. The interior of rotor 77 communicates with the interior of pipe 79 which in turn communicates with a source of driving fluid under pressure (not shown). A plurality of passageways 80, extending rearwardly and circumferentially spaced about the rearward portion of rotor 77, communicate with pipe 79 and are each inclined so that the stream or jet of primary fluid issuing therefrom has an axis inclined to the direction of rotation of the rotor and also rearwardly toward the axis of the unit. Passageways 80 in effect form skewed nozzles the axes of which lie in planes which do not intercept the axis of rotation of rotor 77. Duct 81 may be supported on casing 76 in any suitable way and has a convexly curved interior surface 82 forming a shroud about the interaction space into which the orifices of passageways or nozzles 80 open. As shown, the cross-sectional area of the interaction space defined by duct 81 and end portion 77a of the rotor has a minimum value adjacent where the issuing primary fluid enters and progressively increases in the direction of flow.

In operation, primary or driving fluid is supplied under pressure from pipe 79, flowing rearwardly, from left to right as viewed, into rotor 77 and in issuing from the orifices maintains rotor 77 in rotation about its axis. The helical pseudo blades formed by the primary fluid in the interaction space induces a flow of the fluid surrounding casing 76 through duct 81 and develops an axial force which acts primarily on the surfaces of shrouding duct 81.

Referring now to FIGURE 10, turbo-pump 85 comprises a casing in the form of two independent, coaxial, volute portions 86, 87 communicating respectively with exit ducts 88, 89. Hub 90 is conveniently supported by he casing and in turn supports rotor 91 free to rotate coaxial with the axes of volutes 86, 87. The central portion of rotor 91 is in the form of a shaft while radially outward therefrom the rotor has three distinct portions 91a, 91b and 91c now to be described. Rotor portion 91a extends between the inlet passageway, formed around hub 90, and the delivery end of pipe 92 which communicates with a source of primary fluid. Rotor portion 91a has a plurality of circumferentially spaced pasageways 93 skewed to the axis of rotation of rotor 91 to provide jets, the axes of which are inclined to the direction in which the orifices defined by the pasageways 93 move when rotor 91 turns. Rotor portion 91b extends at an angle to portion 91a and, as will be more fully pointed out, transverse to the direction of the induced flow. Radially outermost rotor portion 91c extends substantially parallel with portion 91a and transverse to the direction of the driving flow. Rotor portions 91b and 91c form portions of volutes 87, 86 respectively and with portion 91a define an annular interaction space which communicates directly with the inlet for secondary or driven fluid defined by hub 90 and the surrounding portion of volute 86. Orifices 94 formed in rotor portion 91b provide communication between the interaction space and the interior of volute 87 while orifices 95 formed through rotor portion 91c provide communication between the interaction space and the interior of volute 86.

In operation, primary fluid, delivered under pressure to turbo-pump 85 through pipe 92, issues through passageways 93, causing rotor 91 to rotate about its axis and forming a plurality of pseudo blades in a generally spiral, rotating pattern which compresses the driven fluid and induces it to flow. As has been indicated, the pseudo blade pattern in such an arrangement rotates with the same angular velocity as the rotor whereby the pseudo blade pattern is stationary relative to the rotor. Orifices 95 formed in rotor portion 91c necessarily also rotate at that angular velocity and are positioned with respect to the pseudo blades so that the driving fluid particles, represented by dots in FIGURE 10, which flow in the direction of solid arrows 96, may pass therethrough into volute 86 and out through duct 88. Orifices 94 formed in rotor portion 91b are positioned with respect to the induced flow pattern, angularly and circumferentially offset relative to orifices 93 and 95 in the present instance, so that the driven fluid compressed between the successive psudo blades may flow therethrough into volute 87 and out duct 89. The direction of the induced flow is indicated by broken arrows 97.

The energy exchange process as carried out by turbo-pump 85 includes the steps of injecting the primary fluid through orifices into the interaction space and translating the orifices in a direction which is inclined to each interface or surface of the pseudo blades. The primary and secondary flows are then separated before any substantial third phase energy transfer may take place and are led away through ducts 88 and 89, respectively, without subsequent mixing. As shown in FIGURE 11, when conditions permit, independent ducts 88, 89 may be merged into a common duct 98 wherein the two fluids are re-merged and complete mixing occurs. Under favorable conditions, this method of first phase energy transfer followed by separation oft he fluids, then re-merging and mixing is substantially more efficient than energy exchange followed by uncontrolled mixing.

As has been pointed out, the present method of energy exchange between fluids lends itself to a process in which the driven fluid, after energization by energy exchange between the flows and heat addition, forms the driving flow in a loop arrangement. In such a process the primary fluid is injected into the interaction space so as to form a moving pseudo blade which motion may be both about and along an axis. The secondary fluid, which may be air, is drawn into the interaction space by the pseudo blades and compressed. Advantage is taken of the difference in orientation of the velocity vectors of the driving and driven flows to effect separation, the driven fluid being led through a chamber where it is heated and then injected into the interaction space to form the driving flow while the deenergized hot fluid is discharged.

One form of apparatus suitable for carrying out such a process is the jet engine or gas generator 100 shown in FIGURE 12, the major components of which are symmetrical about the horizontal axis, as viewed, and are shown partially in section and partially broken away for convenience. Outer casing 101 has a double-walled forward-facing portion (left hand portion as viewed), the radially inner portion 102 of which together with hub 103 defines an annular inlet passageway 104. Hub 103 is mounted coaxially with casing 101 by suitable members (omitted from the drawing for clarity) and carries bearings 105 which rotatably support shaft 106 of rotor 107. Annular partition member 108 is also coaxially supported within casing 101, by means to be described, and is turned back upon itself to form radially inner and outer portions 108a and 108b respectively. Radially outer partition portion 108b together with the peripheral portion of rotor 107, on one side, and the oppositely positioned inner portion 102 of casing 101, on the other side, together define an annular interaction space 109. Radially inner partition portion 108a together with the inner portion 110a of coaxial, annular separator member 110 forms an inner or forward combustion chamber 111, the forward wall of which is formed by the inner surface of rotor 107.

As shown most clearly in FIGURE 15, two endless, concentric arrays of vanes 112, 113, the purpose of which is to be described, serve respectively to connect partition member 108 with separator 110 and the latter with casing 101. The radially inwardly inclined portions of partition 108 and separator 110 form an annular, similarly inclined, passageway 114 the outer end of which communicates through vanes 112 with interaction space 109 while the inner end thereof opens into combustion chamber 111. Suitable combustible fuel, such as gasoline, is introduced into combustion chamber 111 through an annularly shaped pipe 115 extending in the bottom of perforated element 116, V-shaped in transverse section and positioned in the inner end portion of passageway 114 from which it extends into the combustion chamber. A plurality of spray nozzles 117 are mounted along pipe 115.

Separator 110 has a rearwardly extending, annular portion 110b which, together with the adjacent portion of casing 101, defines a second or rear combustion chamber 118 communicating rearwardly with the discharge end of casing 101 in the form of a duct 119. In the direction toward inlet 104, second combustion chamber 118 communicates with one end of annular passageway 120 formed between separator 110 and the outer casing and which, at its opposite end, communicates through vanes 113 with interaction space 109.

As in the case of combustion chamber 111, chamber 118 may have an annularly extending fuel feed pipe 121 mounted therein. Pipe 121 extends within perforated, V-shaped baffle 122 which is in turn secured between outer casing 101 and separator portion 110b by one or more plates 123. Pipe 121 is provided with a plurality of spray nozzles 124, spaced therealong within baffle 122. V-shaped baffle 116, in combustion chamber 111 is similarly supported by means of plates 125, only one of which being shown in the drawing. Both chambers 111 and 118 are provided respectively with suitable igniters 126, 127, which may be conventional spark plugs as shown, and which are utilized to ignite the combustible mixture at the start of operation. Also for starting purposes, a pipe 128 is mounted so as to open into combustion chamber 111 and is connected to a source of fluid under pressure which fluid may be of the same composition as that entering inlet 104. Means including valve 129 provide for control of the flow of fluid through pipe 128 into combustion chamber 111.

As shown most clearly in FIGURE 13, rotor 107 has a plurality of peripheral passages or nozzles 130 formed therethrough defining orifices which provide communication between combustion chamber 111 and interaction space 109. Passages 130 are skewed to the axis of rotation of rotor 107 and so inclined that the jets issuing therefrom into the interaction space are inclined relative to the axis of rotation and of the outer casing in the direction away from inlet 104 and toward discharge duct 119.

To place engine 100 into operation with air being drawn into inlet 104, a combustible mixture of fuel such as gasoline and air is formed in chamber 111 by feeding gasoline through pipe 115 and compressed air through pipe 128. Combustion is started by igniter 126. The hot gases are injected through passages or nozzles 130 into interaction space 109, causing rotor 107 to turn. The jets form gaseous pseudo blades which induce a flow of air through inlet 104, compress the air and cause it to flow rearwardly along the interaction space. Referring to FIGURE 14, it will be seen that the two arrays of vanes 112, 113 are differently oriented and conform respectively to the orientation of the velocity vectors of the cold, driven, air and the hot, driving, gases. The driven air flows through the passages formed between vanes 112 and is led along passageway 114 into combustion chamber 111 where it forms a combustible mixture with the gasoline fed through pipe 115. Once in operation, ignition is automatic and igniter 126 thereafter remains unenergized. The reaction of the jets issuing from passages 130 causes rotor 107 to turn at high speed and the cycle repeats itself so long as the combustible mixture is supplied to chamber 111. Vanes 113 are oriented to conform with the orientation of the velocity vectors of the hot gas particles forming the pseudo blade pattern which pass between vanes 113, along passageway 120 into second combustion chamber 118 where gasoline may be added and ignition started by igniter 127. From chamber 118, the hot gases pass out through discharge duct 119 which may be provided with means, conventional in turbojets, for regulating the area of the discharge opening.

When desired, ports 131 may be formed through separator 110 as indicated to provide for the passage of a controlled amount of gas from passageway 114 into passageway 120. Suitable means may be provided for opening ports 131 more or less.

Engine 100 may be considered as substantially a turbojet having the turbine and the compressor compounded in an energy exchanger of a gaseous pseudo blade type. When operated as described, the mass flow ratio, in the energy exchange process which takes place in interaction space 109, is 1.0 and the compression ratio for this condition may be obtained from FIGURES 22, 23 and 24. In the present instance, $p_2^\circ$ and $p_{2'}^\circ$ represent the stagnation pressures in passage 114 and at the inlet 104, respectively; and $T_{1'}^\circ$ and $T_{2'}^\circ$ are the stagnation temperatures inside rotor 107 and at inlet 104, respectively. The stagnation temperature ratio $T_{1'}^\circ/T_{2'}^\circ = 5$ was used in constructing the graphs of FIGURES 22-24. The peak temperature can be appreciably higher in this device than in conventional turbo-machines because rotor 107 is exposed to hot gases substantially on one side only. The thermal cycle of engine or gas generator 100 may be considered as substantially the same as that of a conventional gas-turbine generator operating with the same peak temperature and compression ratio, and its performance may be computed in the same manner.

When air is bled off from passageway 114 through ports 131 into combustion chamber 118, engine 100 operates as a bypass engine with $\mu$ greater than 1.0. If desired, to provide operation as a by pass type engine, vanes 113 may be omitted so that some of the driven fluid or air may flow into the second combustion chamber along with the hot gases.

It should also be noted that the second combustion chamber may be dispensed with or omitted in some instances.

A further advantage may be gained by discharging the gases flowing rearwardly in duct 119 through orifices to form external pseudo blades. Such an arrangement is provided by merging duct 119 into pipe 61 of unit 55 shown in FIGURE 6.

As has been indicated, the present process lends itself to applications in which an essentially linear induced flow is desired. Apparatus for carrying out such a process with a two-dimensional induced flow pattern as distinguished from the three-dimensional flow induction systems characteristic of apparatus utilizing a rotor will now be described in connection with FIGURE 16-19. Impeller 135 comprises an elongated, generally rectangular, body member 136 having an elongated passageway 137 formed therethrough and bounded on two sides by convexly curved inner walls 138, 139 of body member 136. Passageway 137 communicates at one end thereof with an elongated inlet 140 through which secondary, driven, fluid enters as indicated by arrow 141, and an outlet or discharge opening 142. Adjacent to inlet 140, inner wall surfaces 138, 139 have elongated, U-shaped channels 143, 144 formed therein, respectively, in opposed relation which at one end thereof communicate with duct 145 (FIGURE 18), the latter in turn communicating with a source of primary, driving, fluid under pressure.

Adjacent the mouth of each of the channels 143, 144 the walls defining the same are slotted to provide guideways 146 for the peripheral portions of an endless belt 147, one course 147a of which closes U-shaped channel 143 while an opposite course 147b closes U-shaped channel 144. Belt 147 passes around wheel 148 (FIGURE 18) mounted in one end of body member 136, adjacent to duct 145. Belt 147 also passes around wheel 149 mounted in the opposite end portion of body member 136 by means of shaft 150 supported in bearings 151, only one of which is shown in FIGURE 17. The shaft 152 of wheel 148 may be similarly supported for rotation. A plurality of orifices 153 are formed along belt 147 in spaced array and communicate through inclined passages 154 (FIGURE 19) formed in registration therewith in the belt with one or the other of channels 143, 144.

Primary fluid, entering body member 136 from duct 145, is led into each of the channels 143, 144, partition 155 (FIGURE 18) serving to lead the fluid around wheel 148, and is discharged through orifices 153 into the interaction space in passageway 137 to form blade-like streams the reaction of which causes belt 147 to travel in the direction of arrows 156. The streams are represented by dots in FIGURES 16 and 17 and as is apparent in FIGURE 16, portions of inner wall surfaces 138, 139, with their respective, relatively sharply curved portions 138a and 139a inserted into the path of the issuing streams, form deflecting surfaces causing the pseudo-blades to turn and to be propagated toward discharge opening 142. The process continues as long as primary fluid is fed, endless belt 147 continuing to travel and translate orifices 153 due to the reaction of the issuing streams and resulting in the formation of two arrays of pseudo blades propagating in opposite directions as most clearly shown in FIGURE 17. The secondary fluid, drawn in through inlet 140, is trapped and compressed within the lattice formed by the intersecting pseudo blades and induced to flow through discharge opening 142.

If desired, either or both of wheels 148, 149 may be driven as by an electric motor.

It is recognized that the orifices, through which the driving flow is injected into the interaction space, and translation thereof in the desired direction may be provided in various ways. Furthermore, a turning body such as a rotor is believed to be a device which lends itself to a wide variety of applications that are inherently simple. However, the rotor as well as other moving or turning bodies for defining or translating the orifices may be dispensed with and pseudo blades may be provided with the desired motion and orientation by utilizing low pressure zones, in conjunction with suitable fixed surfaces, to induce motion of the pseudo blades in the desired direction. The apparatus now to be described in connection with FIGURES 20 and 21 may be best considered when it is understood that the primary fluid orifice, in general terms, is defined as the area through which the primary fluid passes the instant before it enters the interaction space and collides with the secondary fluid.

Turning now to FIGURES 20 and 21, the outside of casing 160 may externally be in the shape of a truncated cone having a convexly curved inner surface 161 in which two axially and radially spaced arrays of ports 162, 163 are formed. The space between the outer and inner walls of casing 160 is partitioned by a plurality of curved, divergent wall members 164a to form a plurality of independent compartments 164 into respective ones of which the ports 162 open while a plurality of ports 163 open into a remote end portion of each of the compartments. Since compartments 164 are curved as shown, the port 162 and the ports 163 which communicate through a given compartment are circumferentially displaced relative one another. Passageway 165 formed by inner wall 161 has an inlet end presented toward pipe 166 which communicates with a source of primary fluid under pressure. Adjacent to and on the inlet side of ports 162, passageway 165 has a constriction formed by wall 161.

The process may be started by discharging primary fluid from pipe 16 into passageway 165. The stream tends to follow closely the surface 161 which functions as a deflecting surface, as shown in FIGURE 20. The pressure drop sensed by a port 162 as the stream passes thereby is transferred through its compartment to the corresponding, angularly displaced, ports 163 with the result that a low pressure zone is created downstream and circumferentially displaced relative to the position of the stream in any given instant whereby the stream is induced to turn in that direction about the axis of casing 160 and passageway 165 in the annular passageway 167 defined by the spaced walls 168, 168a of members 169. The radially outward end of passageway 167 instantaneously occupied by the stream, as at 170, constitutes the orifice through which the primary fluid is injected into the external interaction space where air or other surrounding fluid may be compressed and induced to flow by the pseudo blade. When necessary dissymmetry of the entering flow of primary fluid at the inlet of casing 160 relative to the axis thereof may be introduced by initially displacing the casing and pipe 166 relative to each other or in other suitable ways.

From the foregoing, it is apparent that the present method and apparatus may be advantageously utilized in a wide variety of applications. It is also to be noted that when desired, whether the flows move through an arc or are linear advantage may be taken of what has been described as the second phase energy exchange by suitably controlling the flow velocities as described. Thus, while apparatus has been shown and described for effecting such control in connection with radial flow and combined radial and axial flow systems, such apparatus, when suitably oriented may be utilized in conjunction with a linear flow system. Furthermore, various steps and elements may be combined to advantage in addition to those specifically described as was pointed out in connection with FIGURES 12 and 6.

The foregoing analysis of the energy transfer mechanism of the present invention is believed to present the most accurate explanation thereof available at present and is in good conformity with the data gained from actual experience. It is submitted as an aid in understanding the present invention and the unexpected improvement provided thereby.

The terms and expressions which have been employed are used as terms of description and not of limitation, and there is no intention, in the use of such terms and expressions, of excluding any equivalents of the features shown and described or portions thereof, but it is recognized that various modifications are possible within the scope of the invention claimed.

I claim:

1. In a propulsion device in which energy is directly transferred in a first frame of reference from a primary fluid to a secondary fluid independent of mixing, diffusion and heat transfer therebetween to generate a propulsive force, a rotatably mounted casing exposed externally to a circumambient secondary fluid, means for supplying a primary fluid under pressure to the interior of said casing, at least one nozzle skewed to the axis of rotation of said casing and rotatable therewith, said nozzle communicating on one side with the interior of said casing and on the other side with an external interaction space occupied by said second fluid, means comprising said nozzle for injecting said primary fluid into said interaction space and for controlling the same so that it enters said interaction space as a directed stream relative to a second frame of reference moving in a predetermined direction relative to said first frame of reference so that the direction of said primary stream in said second frame of reference is inclined at an angle greater than 90° but less than 180° to said direction, and means including said first mentioned means for controlling at least a significant portion of said primary stream and said secondary fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a direction away from said predetermined direction are transferred from said primary stream to said secondary fluid across said interface through forces acting normal to said interface, said primary stream occupying a limited region in said interaction space, and means for inducing said region occupied by said primary stream and the region occupied by the portion of the secondary fluid energized by said primary stream to advance along said axis of rotation and thereby apply to said casing a propulsive force generated by the interaction of said primary and secondary fluids.

2. In a propulsion device as set forth in claim 1 wherein said last mentioned means comprises said nozzle being inclined toward said axis of rotation.

3. In a propulsion device as set forth in claim 1 wherein said last mentioned means comprises curved surfaces and means for selectively inserting said curved surfaces into the stream emerging from said nozzle.

4. A propulsion unit in which energy is directly transferred in a first frame of reference from a primary fluid to a secondary fluid independent of mixing, diffusion and heat transfer therebetween to generate a propulsive force, comprising an annular casing exposed externally thereof to a circumambient secondary fluid, a rotor mounted in said casing coaxially therewith and freely rotatable about its axis, said rotor being adapted for connection to a source of primary fluid under pressure, said rotor having a plurality of orifices formed in the periphery thereof in a symmetrical annular array each communicating on one side through the interior of said rotor with said source of primary fluid and on the other side with an external interaction space occupied by said secondary fluid, means comprising said orifices for injecting said primary fluid into said interaction space and for controlling the same so that it enters said interaction space as a plurality of directed streams relative to a second frame of reference each moving in a predetermined direction relative to said first frame of reference so that the direction of each of said primary streams in said second frame of reference is inclined at an angle greater than 90° but less than 180° to said direction, and means including said first mentioned means for controlling at least a significant portion of said primary streams and said secondary fluid in said interaction space and confining at least said portion of said secondary fluid with respect to said primary streams so that each primary stream and the secondary fluid are deflected to move in a common direction in said second frame of reference substantially parallel to an interface therebetween, whereby in said first frame of reference energy and momentum in a direction away from said predetermined direction are transferred from each of said primary streams to said secondary fluid across said interfaces through forces acting normal to said interfaces, a pair of axially spaced ring members circumferentially extending about said casing and disposed with said array of orifices therebetween, said ring members each having curved surfaces, and means for selectively inserting said curved surfaces into said streams emerging from said orifices and thereby control the direction of flow of said fluids relative to said axis of rotation and the direction of the force applied thereby to said casing.

5. An energy exchanger by which energy is directly transferred in a first frame of reference from a primary fluid to a secondary fluid independent of mixing diffusion and heat transfer therebetween, comprising a duct enclosing an interaction space adapted adjacent to one end therefor for communication with a source of secondary fluid and having a discharge orifice formed adjacent to the other end thereof, means for injecting a primary fluid into said interaction space and adapted for communication with a source of said primary fluid under pressure, means for controlling said primary fluid so that it enters said interaction space as a directed stream relative to a second frame of reference moving in a predetermined direction relative to said first frame of reference and so that the direction of said primary stream in said second frame of reference is inclined at an angle greater than 90° but less than 180° to said direction, and means including said first mentioned means for controlling at least a significant portion of said primary stream and said secondary fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a predetermined second direction are transferred from said primary stream to said secondary fluid across said interface through forces acting normal to said interface.

6. An energy exchanger as set forth in claim 5 wherein the cross-sectional area of said duct changes in a predetermined way in the direction toward said discharge orifice.

7. An impeller by which energy is directly transferred in a first frame of reference from a primary fluid to a secondary fluid independent of mixing diffusion and heat transfer therebetween, comprising a duct enclosing an interaction space adapted adjacent one end thereof for communication with a source of secondary fluid and adjacent the other end thereof forming a discharge opening, a rotor mounted for rotation about its axis in said duct, said rotor being adapted for connection to a source of primary fluid under pressure, at least one nozzle on the peripheral surface of said rotor communicating through the interior thereof with said source of primary fluid, said nozzle outwardly of said rotor communicating with said interaction space, said nozzle being skewed to said axis and inclined towards said discharge opening, means comprising said nozzle for injecting said primary fluid into said interaction space and for controlling the same so that it enters said interaction space as a directed stream relative to a second frame of reference moving in a predetermined direction relative to said first frame of reference so that the direction of said primary stream in said second frame of reference is inclined at an angle greater than 90° but less than 180° to said direction, and means including said first mentioned means for controlling at least a significant portion of said primary stream and said secondary fluid in said interaction space and confining at least said portion of said secondary fluid relative to said primary stream so that both are deflected to move in a common direction in said second frame of reference substantially parallel to an interface therebetween, whereby in said first frame of reference energy and momentum in a direction away from said predetermined direction are transferred from said primary stream to said secondary fluid across said interface through forces acting normal to said interface, said common direction having a component in the direction of said discharge opening.

8. The method of direct transfer of energy in a first frame of reference from a primary fluid to a secondary fluid, independent of mixing, diffusion and heat transfer therebetween, comprising injecting a primary fluid into an interaction space occupied by and communicating with a source of a secondary fluid, controlling said primary fluid so that it enters said interaction space as a continuous directed stream relative to a second frame of reference moving in a predetermined direction relative to said first frame of reference and so that the direction of said primary stream in said second frame of reference is inclined at an angle greater than 90° but less than 180° to said predetermined direction, and controlling at least a significant portion of said primary stream and said secondary fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a predetermined direction are transferred from said primary stream to said secondary fluid across said interface through forces acting normal to said interface.

9. An energy exchanger for direct transfer of energy in a first frame of reference from a primary fluid to a secondary fluid independent of mixing, diffusion and heat transfer therebetween, comprising means defining an interaction space for communication with a source of secondary fluid and adapted to be occupied thereby, means for injecting a primary fluid into said interaction space and adapted for communication with a source of said primary fluid under pressure, means for controlling said primary fluid so that it enters said interaction space as a continuous directed stream relative to a second frame of reference moving in a predetermined direction relative to said first frame of reference and so that the direction of said primary stream in said second frame of reference is inclined at an angle greater than 90° but less than 180° to said direction, and means including said first mentioned means for controlling at least a significant portion of said primary stream and said secondary fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a predetermined second direction are transferred from said primary stream to said second fluid across said interface through forces acting normal to said interface.

10. The method of transferring energy between fluids, comprising (1) injecting a primary fluid as a directed stream under pressure into an interaction space occupied by a portion of a secondary fluid so as to effect a collision between a leading increment of said primary fluid and a portion of said secondary fluid in said interaction space, (2) advancing said stream in a second direction inclined to the direction of the stream so that the collision between successive increments of said stream and said secondary fluid occurs along a path advancing in said second direction, (3) utilizing successive increments of said primary fluid thus propagated in said space to induce said secondary fluid to flow in a desired direction whereby energy is transferred from the primary to the secondary fluid, (4) substantially separating the thus energized secondary fluid from the de-energized primary fluid and leading them away from said interaction space along separate paths, (5) further energizing the energized secondary fluid, and utilizing the thus energized secondary fluid to form the primary fluid while repeating (1) through (5).

11. The method of transferring energy between fluids as set forth in claim 10 which includes adding further energy to the de-energized primary fluid being led away from the interaction space, and then utilizing said re-energized primary fluid as a driving flow.

12. The method of transferring energy between fluids as set forth in claim 11 which includes injecting said re-energized primary fluid as a second directed stream into a second interaction space occupied by a fluid to be driven so as to effect a collision between a leading increment of said re-energized primary fluid and a portion of the fluid to be driven in said second interaction space, and advancing said second stream in a direction inclined to that of the second stream so that the collision between successive increments of said second stream and the fluid to be driven occurs along a path advancing in said inclined direction.

13. An energy exchanger, comprising means defining an interaction space adapted to be occupied by and for communication with a source of secondary fluid, means adapted for communication with a source of primary fluid under pressure and for injecting said primary fluid as a directed stream into said interaction space so that a leading increment of said primary fluid collides with a portion of said secondary fluid in said interaction space, means for translating said stream in a second direction inclined to the instantaneous direction of said stream so that the collisions between successive increments of said primary fluid entering said interaction space with said secondary fluid occurs along a path advancing in said second direction thereby inducing said secondary fluid to flow in a predetermined direction, means for separating said primary and secondary fluids after collision and before substantial intermixing therebetween, said predetermined direction being inclined to the direction of said stream, and said separating means including means defining two passageways one oriented in the direction of a velocity vector of said stream to receive the same and the other oriented in the direction of a velocity vector of the flowing secondary fluid to receive the same.

14. An energy exchanger, comprising means defining an interaction space adapted to be occupied by and for communication with a source of secondary fluid, means adapted for communication with a source of primary fluid under pressure and for injecting said primary fluid as a directed stream into said interaction space so that a leading increment of said primary fluid collides with a portion of said secondary fluid in said interaction space, means for translating said stream in a second direction inclined to the instantaneous direction of said stream so that the collision between successive increments of said primary fluid entering said interaction space with said secondary fluid occurs along a path advancing in said second direction thereby inducing said secondary fluid to flow in a predetermined direction, means for separating secondary fluid flowing in said predetermined direction from said primary fluid and forming a first and a second path for respectively leading said separated primary and secondary fluids away from said interaction space along separate paths, and means along said second path communicating with said second mentioned means and for further energizing said secondary fluid and forming primary fluid therefrom.

15. An energy exchanger, comprising means defining an interaction space adapted to be occupied by and for communication with a source of secondary fluid, means adapted for communication with a source of primary fluid under pressure and for injecting said primary fluid as a directed stream into said interaction space so that a leading increment of said primary fluid collides with a portion of said secondary fluid in said interaction space, means for translating said stream in a second direction inclined to the instantaneous direction of said stream so that the collision between successive increments of said primary fluid entering said interaction space with said secondary fluid occurs along a path advancing in said second direction thereby inducing said secondary fluid to flow in a predetermined direction, means for separating secondary fluid flowing in said predetermined direction from said primary fluid and forming a first and a second path for respectively leading said separated primary and secondary fluids away from said interaction space along separate paths, means along said second path communicating with said second mentioned means and for further energizing said secondary fluid and forming primary fluid therefrom, and discharge means along said first path including means for forming the fluid flowing therealong into a pseudo blade.

16. An energy exchanger, comprising means defining an interaction space adapted to be occupied by and for communication with a source of secondary fluid, means adapted for communication with a source of primary fluid under pressure and for injecting said primary fluid as a directed stream into said interaction space so that a leading increment of said primary fluid collides with a portion of said secondary fluid in said interaction space, means for translating said stream in a second direction inclined to the instantaneous direction of said stream so that the collision between successive increments of said primary fluid entering said interaction space with said secondary fluid occurs along a path advancing in said second direction thereby inducing said secondary fluid to flow in a predetermined direction, means for separating secondary fluid flowing in said predetermined direction from said primary fluid and forming a first and a second path for respectively leading said separated primary and secondary fluids away from said interaction space along separate paths, means along said second path communicating with said second mentioned means and for further energizing said secondary fluid and forming primary fluid therefrom, and means along said second path for diverting fluid flowing therealong into said first path.

17. An energy exchanger, comprising means defining an interaction space adapted to be occupied by and for communication with a source of secondary fluid, means adapted for communication with a source of primary fluid under pressure and for injecting said primary fluid as a directed stream into said interaction space so that a leading increment of said primary fluid collides with a portion of said secondary fluid in said interaction space, means for translating said stream through an arc in a second direction inclined to the instantaneous direction of said stream so that the collision between successive increments of said primary fluid entering said interaction space with said secondary fluid occurs along an arcuate path advancing in said second direction thereby inducing said secondary fluid to flow in a predetermined direction, means for separating the secondary fluid flowing in said predetermined direction from said primary fluid and for leading said fluids away from said interaction space along separate paths, and means along the path of said secondary fluid communicating with said second mentioned means and for further energizing said secondary fluid and forming primary fluid therefrom.

18. An impeller, comprising a casing forming a pair of coaxial volutes, an annular partition separating the radially outer portions of said volutes, said partition having a central opening formed therethrough through which the radially inner portions of said volutes communicate one with the other, said radially inner portions of said volutes being adapted to be occupied by and communicate with a source of secondary fluid, a rotor extending through said opening and coaxially mounted in said volutes for rotation about its axis, means adapted for communication with a source of primary fluid under pressure and for supplying the same to the interior of said rotor, a plurality of nozzles spaced along the peripheral surface of said rotor each communicating through the interior thereof with said source of primary fluid, said volutes and said rotor defining an interaction space therebetween, said nozzles outwardly of said rotor communicating with said interaction space, said nozzles each being skewed to said axis of rotation, said rotor being adapted to inject said primary fluid into said interaction space as a plurality of directed streams with successive increments of each of said streams colliding with portions of said secondary fluid in said interaction space along a common path advancing about said axis in a second direction inclined to the instantaneous direction of each of said streams as they enter said interaction space, said streams forming a plurality of discrete pseudo blades each occupying a limited region in said interaction space moving in said second direction, a plurality of vanes mounted in annular spaced array along one side of said partition and radially outward of said interaction space, said vanes defining a plurality of passageways therebetween oriented to receive the particles of said primary fluid, a second plurality of vanes mounted in annular spaced array on the other side of said partition and radially outward of said interaction space, said second array of vanes forming a plurality of second passageways each inclined with respect to a corresponding one of said first passages and oriented to receive the particles of said secondary fluid, each of said volutes having a discharge duct communicating with the radially outer portion thereof.

19. A device for creating a flow of a secondary fluid, comprising an elongated casing having a first inlet adapted for communication with a source of primary fluid under pressure, said casing defining a longitudinally extending interaction space adapted for communication through a second inlet formed on one side of said casing with a source of said secondary fluid and on the other side thereof with a discharge opening, said casing having a pair of oppositely disposed longitudinally extending channels formed therein extending along opposite sides of said interaction space and opening toward each other intermediate said second inlet and discharge opening, said channels communicating with said first inlet, an endless belt having opposite courses one extending along each of said channels and separating the same from the adjacent portion of said interaction space, said belt having a plurality of inclined passageways formed therethrough and spaced longitudinally therealong affording communication between said channels and said interaction space, and means for deflecting primary fluid streams issuing from said passageways toward said discharge opening comprising convexly curved surfaces of said casing along said interaction space adjacent to and on the discharge opening side of said channels.

20. A gas generator comprising an elongated casing substantially circular in cross-section open at one end for the inflow of circumambient air and at the other end for the discharge of the gas generated, and laterally enclosing a combustion chamber; an annular member coaxial with said casing and extending longitudinally thereof from a zone adjacent the air entrance end of said casing and forming with said casing a passage generally annular in cross-section for the flow of air to said chamber; means for discharging a fuel into said combustion chamber; a second member coaxial with said casing and in spaced relation thereto and to said annular member forming a deflector for reversing the normal flow of a portion of the hot gas in said combustion chamber and directing it through said annular member; a rotor coaxial with said casing adjacent the air entrance thereto and forming substantially a closure for that end of said annular member adjacent said air entrance; the inner end of said rotor being open to receive the reversed gas flow, and being provided with a plurality of circumferentially spaced jet outlets through which said gas is discharged into said annular air passage in a direction to drive said rotor and induce a flow of circumambient air into said passage.

21. A gas generator comprising a casing substantially circular in cross-section, open at one end for the inflow of circumambient air and at the other end for the discharge of the gas generated; an annular member coaxial with said casing and forming therewith an outer passage generally annular in cross section for the flow of air into said casing and an inner passage coaxial with said casing; a rotor adjacent the air entrance to said casing and substantially closing the end of said inner passage adjacent said air entrance to said annular outer passage; the inner end of said rotor being open and communicating with said inner passage, and said rotor being provided with a plurality of circumferentially spaced passages providing communication between said inner passage and said annular air passage, and being inclined to the axis of said casing in the direction of the air flow in said annular air passage; a second member coaxial with said casing and longitudinally spaced from said annular member to form an annular passage therebetween leading into said inner passage, and also spaced from said casing to form therewith a second annular passage for the flow of hot gas towards the discharge end of said casing; means for discharging fuel into said inner passage to be mixed with the air flowing into said inner passage and burned for driving said rotor; and means for discharging fuel into said second annular passage for the flow of hot gas towards the discharge end of said casing to be burned therein with the air flowing into said second annular passage from said outer passage.

22. A gas generator comprising an elongated casing substantially circular in cross section open at one end for the inflow of circumambient air and at the other end for the discharge of the gas generated, and laterally enclosing a combustion chamber; an annular member within and coaxial with said casing and extending longitudinally thereof from a zone adjacent the air entrance end of said casing and forming with said casing a passage generally annular in cross section for the flow of air to said chamber; means for discharging a fuel into said combustion chamber; a second member within and coaxial with said casing and in spaced relation thereto and to said annular member forming a deflector for reversing the normal flow of a portion of the air flowing through said passage towards said combustion chamber and directing it through said annular member; means for combining said portion of air with a fuel and burning it as it passes through said annular member; a rotor coaxial with said casing adjacent the air entrance thereto and forming substantially a closure for that end of said annular member adjacent said air entrance; the inner end of said rotor being open to receive the burning mixture, and being provided with a plurality of circumferentially spaced jet outlets through which said mixture is discharged into said annular air passage in a direction to drive said rotor and induce a flow of circumambient air into said passage.

23. A gas generator comprising a casing substantially circular in cross section, open at one end for the inflow of circumambient air and at the other end for the discharge of the gas generated; an annular member within and coaxial with said casing and forming therewith an outer passage generally annular in cross section for the flow of air into said casing and laterally enclosing an inner passage coaxial with said casing; a rotor adjacent the air entrance to said casing and substantially closing the end of said inner passage adjacent said air entrance; the inner end of said rotor being open and communicating with said inner passage, and said rotor being provided with a plurality of circumferentially spaced passages providing communication between said inner passage and said outer passage, and being inclined to the axis of said casing in the direction of the air flow in said outer passage for inducing a flow of circumambient air into and forcing it through said outer passage; a second member coaxial with said casing and spaced from said annular member to form a passage therebetween providing communication between said outer and inner passages, and also spaced from said casing to form therewith a passage providing communication between said outer passage and the discharge end of said casing; a first means for discharging fuel into said inner passage to be mixed with the air flowing into said passage and burned for driving said rotor; and a second means for discharging fuel into said passage communicating with the discharge end of said casing to be burned therein with the air forced into said passage from said outer passage.

24. In a device comprising an elongated casing enclosing a combustion chamber; said casing being open at one end for the inflow of circumambient air and at the other end for the discharge of hot gas from said chamber; the combination with means for introducing a combustible fuel into said chamber, of means for effecting a reversal of the normal direction of flow of a portion of the hot gas in said chamber; and means comprising a freely rotatable rotor actuated by said portion of said gas for discharging it into said casing in a zone adjacent the air entrance thereto in a direction to induce a flow of the circumambient air into said casing and thereafter compress it and force it into said chamber, said rotor being driven by the reaction of the gas discharged therefrom.

25. In a device comprising an elongated casing enclosing a combustion chamber; said casing being open at one end for the inflow of circumambient air and at the other end for the discharge of hot gas from said chamber; the combination with means for introducing a combustible fuel into said chamber, of means within said casing for effecting a reversal of the normal direction of flow of a portion of the inflowing air; means for combining said air and a fuel to form a combustible mixture and burning said mixture; and means within said casing including a freely rotatable rotor having at least one opening therein through which at least a portion of the hot gas from said combustion chamber is discharged in a direction to drive said rotor for inducing and compressing the flow of circumambient air into said casing and chamber.

26. An energy exchanger for direct transfer of energy in a first frame of reference from a primary fluid to a secondary fluid independent of mixing, diffusion and heat transfer therebetween, comprising means defining an interaction space for communication with a source of secondary fluid and adapted to be occupied thereby, means for injecting a primary fluid into said interaction space and adapted for communication with a source of said primary fluid under pressure, means for controlling said primary fluid so that it enters said interaction space as a directed stream relative to a second frame of reference moving in a predetermined direction relative to said first frame of reference and so that the direction of said primary stream in said second frame of reference is inclined at an angle greater than 90° but less than 180° to said direction, and means including said first mentioned means for controlling at least a significant portion of said primary stream and said secondary fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a predetermined second direction are transferred from said primary stream to said secondary fluid across said interface through forces acting normal to said interface.

27. The method of direct transfer of energy in a first frame of reference from a primary fluid to a secondary fluid, independent of mixing, diffusion and heat transfer therebetween, comprising injecting a primary fluid into an interaction space occupied by and communicating with a source of a secondary fluid, controlling said primary fluid so that it enters said interaction space as a directed stream relative to a second frame of reference moving in a predetermined direction relative to said first frame of reference and so that the direction of said primary stream in said second frame of reference is inclined at an angle greater than 90° but less than 180° to said predetermined direction, and controlling at least a significant portion of said primary stream and said secondary fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a predetermined direction are transferred from said primary stream to said secondary fluid across said interface through forces acting normal to said interface.

28. The method as set forth in claim 27 wherein after said primary stream and said secondary fluid have been deflected and are moving in a common direction in said second frame of reference said primary stream and said secondary fluid are mixed.

29. The method as set forth in claim 27 wherein after said primary stream and said secondary fluid are deflected to move in said common direction in said second frame of reference said primary and said secondary fluid are separated before any substantial intermixing therebetween may occur.

30. The method as set forth in claim 29 wherein following separation thereof said primary stream and said secondary fluid are remerged.

31. The method as set forth in claim 27 wherein following deflection of said primary and said secondary fluids to said common direction in said second frame of reference the flow velocities of said primary and said secondary fluids are maintained substantially constant.

32. The method as set forth in claim 27 wherein following deflection of said primary and said secondary fluid to move in said common direction in said second frame of reference the flow velocities of said primary stream and said secondary fluid are simultaneously accelerated.

33. The method as set forth in claim 27 wherein following deflection of said primary and said secondary fluid to move in said common direction in said second frame of reference the flow velocities of said primary stream and said secondary fluid are simultaneously decelerated.

34. The method as set forth in claim 27 which further comprises controlling said primary fluid so that the points at which successive increments of said primary stream enter said interaction space describe an annular path.

35. The method as set forth in claim 34 in which the direction of said primary stream is inclined toward the axis of said annular path.

36. The method as set forth in claim 27 which further comprises controlling said primary fluid so that the points at which successive increments of said primary stream enter said interaction space describe a linear path.

37. The method of generating a force on a body in a first frame of reference by means of a direct transfer of energy from primary fluid to a driven fluid independent of mixing, diffusion and heat transfer therebetween, comprising injecting a primary fluid from said body into an interaction space occupied by and communicating with a source of said driven fluid, controlling said primary fluid so that it enters said interaction space as a directed stream relative to a second frame of reference moving in a predetermined direction relative to said first frame of reference and so that the direction of said primary stream in said second frame of reference is inclined at an angle greater than 90° but less than 180° to said predetermined direction, controlling at least a significant portion of said primary stream and said driven fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a predetermined direction are transferred from said primary stream to said driven fluid across said interface through forces acting normal to said interface, and utilizing on said body a pressure field produced by the interaction between successive increments of said primary stream and said driven fluid in said interaction space to provide a force on the body in a desired direction.

38. An energy exchanger as set forth in claim 26, comprising means for separating said primary stream and said secondary fluid before substantial intermixing therebetween across said interface.

39. An energy exchanger as set forth in claim 38, comprising means for remerging said separated primary stream and said secondary fluid.

40. An energy exchanger as set forth in claim 26, comprising means for leading said primary and secondary fluids away together from where they are deflected and for maintaining their flow velocities substantially constant.

41. An energy exchanger as set forth in claim 26, comprising means for leading said primary and secondary fluids away together from where they are deflected and for accelerating their flow velocities.

42. An energy exchanger as set forth in claim 26, comprising means for leading said primary and secondary fluids away together from where they are deflected and for decelerating their flow velocities.

43. An energy exchanger as set forth in claim 38 wherein said separating means comprises means enclosing a portion of said interaction space and defining a passageway oriented to receive said primary stream after deflection thereof, and means for advancing said passageway in step with said primary stream.

44. An energy exchanger as set forth in claim 26 wherein said means for controlling said primary fluid includes means for translating said primary stream through an arc in said predetermined direction relative to said first frame of reference.

45. An energy exchanger as set forth in claim 26 wherein said injecting means comprises rotatable means mounted for rotation through an arc about an axis and having at least one orifice formed therein through which said primary fluid is injected into said interaction space.

46. An energy exchanger as set forth in claim 45, comprising means whereby said interface is inclined toward said axis of rotation.

47. An energy exchanger as set forth in claim 45 wherein said rotatable means comprises a rotor mounted for rotation about said axis and having a peripheral surface extending about said axis, said rotor having its interior adapted for communication with said source of primary fluid, and said orifice being formed in said peripheral surface and communicating on one side thereof with said primary fluid source through the interior of said rotor and communicating on the other side thereof with said interaction space.

48. An impeller by which energy is directly transferred in a first frame of reference from a primary fluid to a secondary fluid independent of mixing, diffusion and heat transfer therebetween, comprising a rotor rotatable about its axis and adapted for connection to a source of primary fluid under pressure, at least one nozzle on said rotor communicating through the interior thereof with said source of primary fluid, said nozzle outwardly of said rotor communicating with an interaction space occupied by and in turn communicating with a source of said secondary fluid, said nozzle being skewed to said axis, means comprising said nozzle for injecting said primary fluid into said interaction space and for controlling the same so that it enters said interaction space as a directed stream relative to a second frame of reference moving in a predetermined direction relative to said first frame of reference so that the direction of said primary stream in said second frame of reference is inclined at an angle greater than 90° but less than 180° to said direction, and means including said first mentioned means for controlling at least a significant portion of said primary stream and said secondary fluid in said interaction space and confining at least said portion of said secondary fluid with respect to said primary stream so that both are deflected to move in a common direction in said second frame of reference substantially parallel to an interface therebetween, whereby in said first frame of reference energy and momentum in a direction away from said predetermined direction are transferred from said primary stream to said secondary fluid across said interface through forces acting normal to said interface.

References Cited in the file of this patent

UNITED STATES PATENTS

| | | |
|---|---|---|
| 37,940 | Plant | Mar. 17, 1863 |
| 900,814 | Wilson | Oct. 13, 1908 |
| 1,104,963 | Coanda | July 28, 1914 |
| 1,220,000 | Radiguer | Mar. 20, 1917 |
| 1,345,640 | Schmidt | July 6, 1920 |
| 1,362,997 | Koleroff | Dec. 21, 1920 |
| 1,712,625 | Lawaczeck | May 14, 1929 |
| 1,827,246 | Lorenzen | Oct. 31, 1931 |
| 1,933,948 | Weber | Nov. 7, 1933 |
| 2,134,460 | Van den Honert | Oct. 25, 1938 |
| 2,333,317 | Kritzer | Nov. 2, 1943 |
| 2,356,746 | Boushey | Aug. 29, 1944 |
| 2,440,865 | Lynch et al. | May 4, 1948 |
| 2,461,186 | Seippel | Feb. 8, 1949 |
| 2,500,117 | Chandler | Mar. 7, 1950 |
| 2,524,591 | Chandler | Oct. 3, 1950 |
| 2,526,618 | Darrieus | Oct. 24, 1950 |
| 2,565,907 | Bertin et al. | Aug. 28, 1951 |
| 2,581,902 | Bodine | Jan. 8, 1952 |
| 2,603,945 | Brown | July 22, 1952 |
| 2,628,020 | Koch | Feb. 10, 1953 |
| 2,677,236 | Grinsted | May 4, 1954 |
| 2,757,509 | Jendrassik | Aug 7, 1955 |
| 2,778,318 | Von Haken | Jan. 22, 1957 |
| 2,780,405 | Jendrassik | Feb. 5, 1957 |
| 2,793,496 | Mortimer | May 28, 1957 |
| 2,831,320 | Duncan | Apr. 22, 1958 |
| 2,935,245 | McDonald | May 3, 1960 |

FOREIGN PATENTS

| | | |
|---|---|---|
| 522,163 | France | Mar. 22, 1921 |
| 561,787 | France | Aug. 17, 1923 |
| 590,805 | France | Mar. 26, 1925 |
| 592,393 | France | Apr. 29, 1925 |
| 853,227 | France | Nov. 28, 1939 |
| 1,007,027 | France | Feb. 6, 1952 |
| 1,200,145 | France | June 29, 1959 |
| 565,381 | Germany | Nov. 29, 1932 |
| 916,607 | Germany | Aug. 12, 1954 |
| 1,734 of 1876 | Great Britain | Apr. 24, 1876 |
| 139,856 | Great Britain | Mar. 18, 1920 |
| 166,583 | Great Britain | July 11, 1921 |
| 299,420 | Great Britain | May 15, 1930 |
| 680,458 | Great Britain | Oct. 8, 1952 |

UNITED STATES PATENT OFFICE
CERTIFICATE OF CORRECTION

Patent No. 3,046,732                                   July 31, 1962

Joseph V. Foa

It is hereby certified that error appears in the above numbered patent requiring correction and that the said Letters Patent should read as corrected below.

Column 1, line 41, for "second" read -- secondary --; column 4, line 29, for "receleration" read -- deceleration --; column 6, line 66, for "of" read -- or --; column 7, line 6, for "fas" read -- far --; line 32, for "wtih" read -- with --; column 12, line 53, for "stationary" read -- the rotor --; line 56, for "$a_1\beta_1\theta$" read -- $a_t\beta_t\theta$ --; line 62, for "$\sigma$-$u_2^2/u_1^2$" read -- $\sigma=u_2^2/u_1^2$ --; column 15, line 47, for "psudo" read -- pseudo --; line 63, for "oft he" read -- of the --; line 72, after "blade" insert -- pattern --; column 19, line 32, for "16" read -- 166 --; column 22, line 64, for "second" read -- secondary --.

Signed and sealed this 20th day of November 1962.

(SEAL)
Attest:
ERNEST W. SWIDER
Attesting Officer

DAVID L. LADD
Commissioner of Patents